United States Patent
Brady et al.

(10) Patent No.: US 7,822,628 B2
(45) Date of Patent: Oct. 26, 2010

(54) SYSTEM AND METHOD FOR A PLANNER

(75) Inventors: Jeffrey Brady, Jersey City, NJ (US);
Kevin McMurtry, Basking Ridge, NJ (US); Greg Miller, Chesapeake, VA (US)

(73) Assignee: Advanced Health Media, LLC, Union City, NJ (US)

( * ) Notice: Subject to any disclaimer, the term of this patent is extended or adjusted under 35 U.S.C. 154(b) by 651 days.

(21) Appl. No.: 10/440,521

(22) Filed: May 16, 2003

(65) Prior Publication Data
US 2004/0044644 A1 Mar. 4, 2004

Related U.S. Application Data
(60) Provisional application No. 60/408,066, filed on Sep. 4, 2002.

(51) Int. Cl.
*G06F 9/46* (2006.01)
(52) U.S. Cl. .......................................................... 705/8
(58) Field of Classification Search ............... 707/9–10; 705/8–9; 709/202–204
See application file for complete search history.

(56) References Cited

U.S. PATENT DOCUMENTS

| | | | |
|---|---|---|---|
| 5,124,912 A | | 6/1992 | Hotaling et al. |
| 5,889,945 A | * | 3/1999 | Porter et al. ................. 709/204 |
| 5,899,979 A | * | 5/1999 | Miller et al. .................... 705/9 |
| 5,930,471 A | * | 7/1999 | Milewski et al. ............. 709/204 |
| 5,960,406 A | * | 9/1999 | Rasansky et al. ............... 705/9 |
| 6,085,166 A | * | 7/2000 | Beckhardt et al. .............. 705/9 |
| 6,151,582 A | | 11/2000 | Huang et al. |
| 6,223,177 B1 | | 4/2001 | Tatham et al. |
| 6,324,517 B1 | * | 11/2001 | Bingham et al. ............... 705/8 |
| 6,442,567 B1 | | 8/2002 | Retallick et al. |
| 6,571,249 B1 | * | 5/2003 | Garrecht et al. ............. 707/100 |
| 6,591,300 B1 | | 7/2003 | Yurkovic |
| 6,732,103 B1 | * | 5/2004 | Strick et al. .................. 707/10 |
| 6,760,731 B2 | | 7/2004 | Huff |
| 6,782,531 B2 | | 8/2004 | Young |
| 7,080,059 B1 | * | 7/2006 | Poston et al. .................. 707/1 |
| 2001/0014856 A1 | | 8/2001 | Wuppermann et al. |
| 2001/0014865 A1 | * | 8/2001 | Franke ......................... 705/1 |

(Continued)

OTHER PUBLICATIONS www.b-there.com (archived on www.archive.org, Apr. 2001) [retrieved from Internet].*

(Continued)

*Primary Examiner*—Jonathan G. Sterrett
*Assistant Examiner*—Peter Choi
(74) *Attorney, Agent, or Firm*—Connolly Bove Lodge & Hutz LLP

(57) ABSTRACT

A planning system and method is disclosed. The planning system includes at least one business rule remote from at least one client, a meeting editor, and at least one tracker communicatively connected to the meeting editor, wherein the at least one tracker tracks at least two data items selected from the group consisting of invitees to at least one of the at least one meetings, respondents to invitations to the meeting, at least one speaker of the meeting, at least one host of the meeting, finances of the meeting, and a venue of the meeting, and wherein the at least one tracker communicates the at least two data items with the meeting editor.

11 Claims, 44 Drawing Sheets

U.S. PATENT DOCUMENTS

| | | | |
|---|---|---|---|
| 2001/0034769 A1 | 10/2001 | Rast | |
| 2002/0016729 A1* | 2/2002 | Breitenbach et al. | 705/9 |
| 2002/0111845 A1* | 8/2002 | Chong | 705/8 |
| 2003/0177051 A1 | 9/2003 | Driscoll et al. | |
| 2004/0161090 A1* | 8/2004 | Digate et al. | 379/202.01 |
| 2005/0084086 A1 | 4/2005 | Hesse | |

OTHER PUBLICATIONS www.allmeetings.com (archived on www.archive.org, May 2000) [retrieved from Internet].*

"PlanSoft Chooses b-there Platform to Deliver End-to-End Meeting and Attendee Management solutions," Business Wire, Apr. 12, 2001 [retrieved from Proquest].*

"seeUthere.com and PlanSoft Partner to Provide Online Event Planning Services," PR Newswire, Feb. 8, 2000 [retrieved from Proquest].*

"mpoint.com Sets New Standard for Meeting and Convention Industry," PR Newswire, Sep. 6, 2000 [retrieved from Proquest].*

"Convention & Visitors Bureaus Leverage PlanSoft's Industry Leading Technology to Attract More Meeting Professionals," Business Wire, Mar. 26, 2001 [retrieved from Proquest].*

"ASAE/PlanSoft Partnership Expands ASAE Web Site Provides Access Point to PlanSoft Network; Technology Training Center to Open," PR Newswire, Oct. 27, 1999 [retrieved from Proquest].*

Williams, Kelly. "Plan your next meeting via the Web," Office Solutions, Aug. 2000 [retrieved from Proquest].* www.plansoft.com (archived on www.archive.org, Jun. and Aug. 2001) [retrieved from Internet].* http://Send2fax.com, 2000-2004. Printed from the Internet on Dec. 8, 2004.

Archived version from www.archive.org of www.allmeetings.com, May 2000 [retrieved from Internet].

"b-there.com and AllMeetings.com Partnership Revolutionizes Meeting Planning Process," PR Newswire, May 4, 2000 [retrieved from Proquest].

"b-there.com Announces First Web Site to Integrate Datalex—Web Ventures' Air Booking Engine with Negotiated Group Rate Capability," PR Newswire, Aug. 5, 1999 [retrieved from Proquest].

"b-there.com Selects eCal to Provide Integrated Web-Based Calendaring; meeting and Event Organizers Now Able to Manage Their Schedules Via the Web," PR Newswire, Jul. 8, 1999 [retrieved from Proquest].

Dec. 10, 2008 Office Action for U.S. Appl. No. 10/949,890 (filed Sep. 24, 2004).

* cited by examiner

| Main Menu | Add Meeting | Edit Meeting | Profile Edit | Reports | Medsite | Fulfillment | Financial | Admin |

Glucotrol 2001 Dialogue Dinner Meetings                                              Mtg List   Save Edit Meeting: [Venue] [Travel] [Participant] [Financial Summary] [Rep Requested Changes]

- 504 Meeting Code: GLX-F3F-3
- 506 Meeting Type: Promotional
- 508 Meeting Format: Dinner Meeting
- Meeting Topic: Type II Diabetes — 510 Meeting Status: In Progress
- 512 Meeting Time: 6:30 PM — 514 Meeting Date: 1/25/2002
- Add New Host: Heather Webber
- 518 Add New AHM Contact: Michele D Galiszewski — 516 Date Request Received: 12/19/2001
- 520 Add New Moderator: — Host Voicemail:
- 550 Date 7 Day Packet Sent: — 522 Add New Additional Point Person:
- 552 7 Day Packet Tracking Number: — Target list included?: NO
- 560 Feedback Report Returned: NO — 554 Date Invitation Mailed:
- — 556 Date Attendance Roster Returned:
- Gift Certificates Requested:
- 558 Meeting Notes: 1.7 Heather called, asked for a few days to get venue info together. I explained the lack of time we have for the 1.25 mtg and that we need that venue info asap. She said she will call on Wednesday. KN
- 524 Territory Number: — Contract Location Description:
- Speaker Information — 526 +Add

Main Menu | Add Meeting | Edit Meeting | Profile Edit | Reports | Medsite | Fulfillment | Financial Meeting List: Glucotrol 2001 Dialogue/Dinner/Meetings View Meeting Requests (0)

Meeting Code: [____] Go!

| Mtg Code | Date/Time | Status | Host | APP | Moderator | Speaker #1 | Speaker #2 | Speaker #3 | City/State | Venue | AV |
|---|---|---|---|---|---|---|---|---|---|---|---|
| ☒ GLX-J1A-2 | 10/16/2001 6:30:00 PM | Completed | Journeay, Arnold | | | Tolbert, Jerome | | | Princeton, MA | Sonoma Restaurant | |
| ✗ GLX-F1F | 12/4/2001 6:30:00 PM | Completed | Coleman, Rob | | | Sternthal, Elliott | | | Boston, MA | Laurel Restaurant | |
| ☒ GLX-J5E-2 | 9/21/2001 6:00:00 PM | Completed | Graef, Jeff | | | Fine, Stewart | | | Mokena, IL | Mr. Benny's Restaurant | |
| ✗ GLX-F3F-3 | 1/25/2002 7:00:00 PM | Completed | Webber, Heather | | | Fine, Stewart | | | Spartanburg, SC | The Peddler | American Rental |
| ☒ GLX-J6D-2 | 11/1/2001 6:30:00 PM | Completed | Everette, Bethy | | | Kennedy, Diana | | | Oklahoma City, OK | Pearl's Restaurant | Cory's |
| ✗ GLX-J6E-2 | 11/27/2001 12:00:00 PM | Completed | Gooch, Dennis | | | Castro, Jaime | | | Fort Worth, TX | Fort Worth Clinic | |
| ☒ GLX-J6F-2 | 10/16/2001 6:30:00 PM | Completed | Barker, John | | | Thomas, Jeff | | | Pittsburg, TX | Carson House Inn and Grille | |
| ✗ GLX-J6H-2 | 10/11/2001 6:30:00 PM | Completed | Gill, Craig | | | Miller, Sam | | | San Antonio, TX | Biga on the Banks | |
| ☒ GLX-J7B-2 | 10/16/2001 6:30:00 PM | Cancelled | McFaul, David | | | Kaltenborn, K.C. | | | Anchorage, AK | Sullivan's Steakhouse | |
| ✗ GLX-F5B-3 | 2/21/2002 7:30:00 AM | Set-up complete | Schaefer, David | | | Boyle, Patrick | | | | In Progress | |
| ☒ GLX-F3F-2 | 2/1/2002 6:30:00 PM | Completed | Webber, Heather | | | Fine, Stewart | | | Union, SC | The home of Vivian Clark,MD | American Rental |
| ✗ | 9/20/2001 | | | | | Venegas, | | | Kapolei, | J.W Marriott | |

Edit Meeting: [Venue] [Travel] [Participant] [Financial Summary] [Rep Requested Changes]

| | | | |
|---|---|---|---|
| Meeting Code: | GLX-F3F-3 — 1002 | Meeting Status: | Completed ▼ — 1004 |
| Meeting Type: | Promotional ▼ — 1006 | Meeting Date: | 1/25/2002 — 1008 |
| Meeting Format: | Dinner Meeting ▼ — 1010 | | |
| Meeting Topic: | Type II Diabetes ▼ — 1012 | | |
| Meeting Time: | 7:00  PM ▼ — 1014 | Date Request Received: | 12/19/2001 — 1016 |
| Add New Host: ☒ | Heather Webber — 1018 | Host Voicemail: | — 1020 |
| Add New AHM Contact: ☒ | Michele D Galiszewski — 1022 | Add New Additional Point Person: ☒ | — 1024 |
| Add New Moderator: ☒ | — 1026 | Target list included?: | NO ▼ — 1028 |
| Date 7 Day Packet Sent | 1/18/2002 — 1030 | Date Invitation Mailed: | — 1032 |
| 7 Day Packet Tracking Number: | — 1034 | Date Attendance Roster Returned: | 1/29/2002 — 1036 |
| Feedback Report Returned: | NO ▼ — 1038 | Gift Certificates Requested: | — 1040 |
| Meeting Notes: ☐ | 1.7 Heather called, asked for a few days to get venue info together. I explained the lack of time we have for the 1.25 mtg and that we need that venue info asap. She said she will call on Wednesday. KN — 1042  Contact Location Description: — 1046 | | |
| Territory Number: | ▼ — 1044 | Speaker Status: | ▼ |
| Speaker Information | | | |
| Add New Speaker: ☒ | Stewart Fine — 1050 | Speaker Confirmed: | Confirmed ▼ — 1052 |
| Speaker Travel: | By AHM ▼ — 1054 | Date Speaker Confirmed: | via Phone ▼ — 1056 |
| | | | 1/7/2002 — 1058 |
| | | | +Add — 1048 |

Speaker Notes: 1/10 Spoke with Dr. Fine regarding travel. AHM will handle round trip for this meeting MR
1.7 Spoke with Dr. Fine, confirmed for mtg. AHM will handle all travel. Honoraria $2,000. KN
12-19 Speakers listed not on national list nor are they local to program location. MG Business Unit/Geography:
Business Unit: ▼   Geography: ▼  — 1062

Budget Categories:
Description:   Projected Amount:   Total Amount:   Difference:  — 1064

Edit Venue Details: [Back to Top] [Travel] [Participant] [Financial Summary] [Rep Requested Changes] — 1066

| Field | Value | | Field | Value |
|---|---|---|---|---|
| Venue Name: | The Peddler — 1068 | | Venue Address: | 464 E. Main Street Spartanburg, SC — 1070 |
| Phone Number: | (864) 583-5874 — 1072 | | Fax Number: | — 1078 |
| Venue Contact Name: | — 1076 | | Meeting Room: | |
| Contract Status: | Contracted ▼ — 1080 | | Room accessible by: | 5:30:00 PM ▼ — 1081 |
| Reservation Made: | 1/11/2002 ▼ — 1082 | | Venue Capacity: | — 1084 |
| CC Authorization Sent Date: | 1/11/2002 ▼ — 1086 | | Cost Per Person: | — 1088 |
| Date Contract Sent: | 1/11/2002 ▼ — 1090 | | Venue Cost: | — 1092 |
| Date Contract Returned: | — 1094 | | Payment Method: | Visa ▼ — 1096 |
| AV Supplier Type: | Venue ▼ — 1098 | | Add New Supplier: ☒ | — 1001 |
| AV Contact Name: | — 1003 | | AV Supplier City & State: | Spartanburg, SC — 1005 |
| AV Supplier Phone Number: | (864) 583-6393 — 1007 | | AV Supplier Fax Number: | — 1009 |

Venue Notes: 1/14 Heather will pick up a/v from rental place. MR — 1011
1/11 Spoke with rep and she wants a la carte and she will pick up the bill if over MR

FIG. 12

| Main Menu | Add Meeting | Edit Meeting | Profile Edit | Reports | Medsite | Fulfillment | Financial |

Advanced Health Media
2840 Morris Avenue
Union, NJ 07083
Phone: 908-687-3888
Fax: 908-687-7383
www.ahmdirect.com Glucotrol 2001 Dialogue Dinner Meetings 2-Day Report - 02/14/02 10:45 AM — 1602

| Session Code | Date | Time | Location | Host | Moderator | Current Reservations | Actual Attendance |
|---|---|---|---|---|---|---|---|
| GLX-F3F-2 | 02/01/02 | 6:30 PM | The home of Vivian Clark, MD Union, SC | Heather Webber | | 8 | 8 |

| Main Menu | Add Meeting | Edit Meeting | Profile Edit | Reports | Medsite | Fulfillment | Financial |

Advanced Health Media
2840 Morris Avenue
Union, NJ 07083
Phone: 908-687-3888
Fax: 908-687-7383
www.ahmdirect.com Glucotrol 2001 Dialogue Dinner Meetings 7-Day Report - 02/14/02 10:46 AM

| Session Code | Date | Time | Location | Host | Moderator | Current Reservations | Actual Attendance | 7 day packet sent |
|---|---|---|---|---|---|---|---|---|
| GLX-F3C-3 | 02/08/02 | 6:30 PM | Holiday Inn Meridian, MS | Dan Furlong | | 8 | TBD | 02/04/2002 |
| GLX-F5A-2 | 02/13/02 | 6:30 PM | Prengers Norfolk, NE | Carey Peterson | | 19 | TBD | 02/06/2002 |

| Main Menu | Add Meeting | Edit Meeting | Profile Edit | Reports | Medsite | Fulfillment | Financial |
|---|---|---|---|---|---|---|---|

| Status | Count |
|---|---|
| Cancelled | 20 |
| Completed | 106 |
| Set-up complete | 7 |
| Total | 133 |

Advanced Health Media
2840 Morris Avenue
Union, NJ 07083
Phone: 908-687-3888
Fax: 908-687-7383
www.ahmdirect.com Glucotrol 2001 Dialogue Dinner Meetings Status Summary Report - 02/14/02 10:49 AM

| Session Code | Date/Time | Location | Host | Host VM Ext | Add. Host | Moderator | Speaker #1 | Speaker #2 | Speaker #3 | Meeting Topic | Current Reservations | Actual Attendance | Status |
|---|---|---|---|---|---|---|---|---|---|---|---|---|---|
| GLX-F1F | 12/04/01 6:30 PM | Laurel Restaurant Boston, MA | Rob Coleman | 80254 | | | Elliott Sternthal | | | Type II Diabetes | 0 | 0 | Completed |
| GLX-F3C | 01/08/02 6:30 PM | Schimmel's Jackson, MS | Dan Furlong | 87608 | Billy Lankford | | William Cefalu | | | Type II Diabetes | 5 | 7 | Completed |
| GLX-F3C-2 | 01/09/02 7:30 AM | Jackson Medical Clinic Jackson, MS | Dan Furlong | 87608 | Billy Lankford | | William Cefalu | | | Type II Diabetes | 0 | 0 | Completed |
| GLX-F3C-3 | 02/08/02 6:30 PM | Holiday Inn Meridian, MS | Dan Furlong | 87608 | Christopher Wilson | | Jerome Tolbert | | | Type II Diabetes | 8 | 0 | Completed |
| GLX-F3C-4 | 01/29/02 6:30 PM | Fairhope Inn & Restaurant Fairhope, AL | Dan Furlong | 87608 | Angela Gibson | | Mark Reese | | | Type II Diabetes | 5 | 11 | Completed |
| GLX-F3F | 01/17/02 6:30 PM | Cypress Charleston, SC | Michael Charen | | Tom Malick | | Shailesh Patel | | | Type II Diabetes | 12 | 14 | Completed |
| GLX-F3F-2 | 02/01/02 6:30 PM | The home of Vivian Clark, MD | Heather Webber | | | | Stewart Fine | | | Type II Diabetes | 8 | 8 | Completed |

Labels: 1802, 1804, 1806, 1808, 1810, 1812, 1814, 1816, 1818, 1820, 1822, 1824, 1826, 1828

| Main Menu | Add Meeting | Edit Meeting | Profile Edit | Reports | Medsite | Fulfillment | Financial |

Advanced Health Media
2840 Morris Avenue
Union, NJ 07083
Phone: 908-687-3888
Fax: 908-687-7383
www.ahmdirect.com Glucotrol 2001 Dialogue Dinner Meetings Weekly Roster Report - 02/14/02 10:48 AM

| Session Code | Date | Time | Location | Host | Moderator | Current Reservations | Actual Attendance |
|---|---|---|---|---|---|---|---|
| GLX-F3C-3 | 02/08/02 | 6:30 PM | Holiday Inn Meridian, MS | Dan Furlong | | 8 | TBD |
| GLX-F3J | 02/07/02 | 7:00 PM | Antiquarian Restaurant Lakeland, FL | Edsel Bester | | 16 | 12 |
| GLX-F5A-2 | 02/13/02 | 6:30 PM | Prengers Norfolk, NE | Carey Petersen | | 19 | TBD |
| GLX-F5B | 02/21/02 | 6:00 PM | Manny's Steakhouse Minneapolis, MN | David Schaefer | | 0 | TBD |
| GLX-F5B-2 | 02/20/02 | 6:30 PM | D'Amico Cucina Minneapolis, MN | David Schaefer | | 1 | TBD |
| GLX-F5B-3 | 02/21/02 | 7:30 AM | In Progress | David Schaefer | | 0 | TBD |
| GLX-F5B-4 | 02/21/02 | 12:30 PM | In Progress | David Schaefer | | 0 | TBD |
| GLX-F5B-5 | 02/20/02 | 2:30 PM | In Progress | David Schaefer | | 0 | TBD |

FIG. 19

Main Menu   Add Meeting   Edit Meeting   Profile Edit   Reports   Medsite   Fulfillment   Financial Advanced Health Media
2840 Morris Avenue
Union, NJ 07083
Phone: 908-687-3888
Fax: 908-687-7383
www.ahmdirect.com Glucotrol 2001 Dialogue Dinner Meetings Invitation Report - 02/14/02 10:48 AM

| Session Code | Meeting Date/Time | Location Name | Host Name | Date Invitation Mailed | Number of Invitation Mailed | Acceptances | Actual Attendance | Roster Returned | Meeting Status |
|---|---|---|---|---|---|---|---|---|---|
| GLX-F1F | 12/04/01 6:30PM | Laurel Restaurant | Rob Coleman | 11/27/2001 | 0 | 0 | 0 | | Completed |
| GLX-F3C | 01/08/02 6:30PM | Schimmel's | Dan Furlong | 12/12/2001 | 9 | 5 | 7 | 01/28/02 | Completed |
| GLX-F3C-2 | 01/09/02 7:30AM | Jackson Medical Clinic | Dan Furlong | | 0 | 0 | 0 | | Completed |
| GLX-F3C-3 | 02/08/02 6:30PM | Holiday Inn | Dan Furlong | | 9 | 8 | 0 | | Completed |
| GLX-F3C-4 | 01/29/02 6:30PM | Fairhope Inn & Restaurant | Dan Furlong | 01/08/2002 | 12 | 5 | 11 | 02/12/02 | Completed |
| GLX-F3F | 01/17/02 6:30PM | Cypress | Michael Charen | 12/03/2001 | 17 | 12 | 14 | 01/24/02 | Completed |
| GLX-F3F-2 | 02/01/02 6:30PM | The home of Vivian Clark, MD | Heather Webber | | 8 | 8 | 8 | 02/11/02 | Completed |
| GLX-F3F-3 | 01/25/02 7:00PM | The Peddler | Heather Webber | | 34 | 11 | 25 | 01/29/02 | Completed |
| GLX-F3J | 02/07/02 | Antiquarian Restaurant | Edsel Bester | 12/12/2001 | 17 | 16 | 12 | 02/12/02 | Completed |

FIG. 20

| Main Menu | Add Meeting | Edit Meeting | Profile Edit | Reports | Medsite | Fulfillment | Financial |

| Rosters returned | 91 - 86% (percent of completed meetings) |
| Total invitations mailed | 1620 |
| Total RSVPS | 685 - 42% (percent of invitations mailed) |
| Average RSVPS | 7.5 |
| Total attendance | 880 - 128% (percent of RSVPs) |
| Average attendance | 9.7 |

Advanced Health Media
2840 Morris Avenue
Union, NJ 07083
Phone: 908-687-3888
Fax: 908-687-7383
www.ahmdirect.com Glucotrol 2001 Dialogue Dinner Meetings Results Report - 02/14/02 10:51 AM

| Session Code | Date | DBM | Invitations Mailed | RSVPs | Actual Attendance |
|---|---|---|---|---|---|
| GLX-F3C | 01/08/02 | Dan Furlong | 9 | 5 | 7 |
| GLX-F3C-4 | 01/29/02 | Dan Furlong | 12 | 5 | 11 |
| GLX-F3F | 01/17/02 | Michael Charen | 17 | 12 | 14 |
| GLX-F3F-2 | 02/01/02 | Heather Webber | 8 | 8 | 8 |
| GLX-F3F-3 | 01/25/02 | Heather Webber | 34 | 11 | 25 |
| GLX-F3J | 02/07/02 | Edsel Bester | 17 | 16 | 12 |
| GLX-F3J-2 | 02/06/02 | Edsel Bester | 20 | 16 | 16 |
| GLX-F5A | 01/26/02 | Carey Petersen | 8 | 7 | 5 |
| GLX-F7F | 12/06/01 | John Dauser | 24 | 13 | 21 |
| GLX-J1A | 12/05/01 | Arnold Journeay | 62 | 2 | 7 |
| GLX-J1C | 12/04/01 | Gregory Davis | 7 | 6 | 7 |
| GLX-J1C-2 | 12/12/01 | Gregory Davis | 13 | 9 | 8 |
| GLX-J1D | 12/05/01 | Scott Ackerman | 11 | 6 | 9 |
| GLX-J1F | 11/28/01 | Frank Forbes | 13 | 0 | 12 |
| GLX-J1G | 10/18/01 | Patrick Egan | 70 | 14 | 6 |
| GLX-J1J | 11/28/01 | James Jean-Pierre | 58 | 5 | 12 |

| Meeting Code | Meeting Date/Time | Meeting Status | Speaker Status | Date Request Received | Date Speaker Confirmed | Date Contract Returned | Date Invitations Mailed | Date 7-day Sent | Date Roster Returned |
|---|---|---|---|---|---|---|---|---|---|
| GLX-F1F | 12/4/2001 6:30:00 PM | Completed | Confirmed | 11/27/2001 | 11/27/2001 | | 11/27/2001 | | |
| GLX-F3C | 1/8/2002 6:30:00 PM | Completed | Confirmed | 12/03/2001 | 12/03/2001 | | 12/12/2001 | 01/02/2002 | 01/28/2002 |
| GLX-F3C-2 | 1/9/2002 7:30:00 AM | Completed | Confirmed | 12/03/2001 | 12/03/2001 | | | | |
| GLX-F3C-3 | 2/8/2002 6:30:00 PM | Completed | Confirmed | 01/07/2002 | 01/02/2002 | | | 02/04/2002 | |
| GLX-F3C-4 | 1/29/2002 6:30:00 PM | Completed | Confirmed | 11/26/2001 | 01/07/2002 | | 01/08/2002 | 01/22/2002 | 02/12/2002 |
| GLX-F3F | 1/17/2002 6:30:00 PM | Completed | Confirmed | 12/19/2001 | 11/30/2001 | | 12/03/2001 | 01/10/2002 | 01/24/2002 |
| GLX-F3F-2 | 2/1/2002 6:30:00 PM | Completed | Confirmed | 12/19/2001 | 01/07/2002 | | | 01/24/2002 | 02/11/2002 |
| GLX-F3F-3 | 1/25/2002 7:00:00 PM | Completed | Confirmed | 11/20/2001 | 01/07/2002 | | | 01/18/2002 | 01/29/2002 |

Advanced Health Media
2840 Morris Avenue
Union, NJ 07083
Phone: 908-687-3888
Fax: 908-687-7383
www.ahmdirect.com

FIG. 23

| Meeting Code | Meeting Date | Business Unit | Geography | Meeting Type | Meeting Format | Host | Miscellaneous | Attendee Honorarium | (E) Spkr Air | Speaker Expenses | (T) Spkr Honorarium | (E) Spkr Honorarium | Entertainment | Venue Room |
|---|---|---|---|---|---|---|---|---|---|---|---|---|---|---|
| GLX-F1F | 12/04/2001 | | | Promotional | Dinner Meeting | Coleman, Rob | $0.00 | $0.00 | $0.00 | $0.00 | $0.00 | $0.00 | $0.00 | $0 |
| GLX-F3C | 01/08/2002 | | | Promotional | Dinner Meeting | Furlong, Dan | $0.00 | $0.00 | $0.00 | $0.00 | $0.00 | $0.00 | $0.00 | $0 |
| GLX-F3C-2 | 01/09/2002 | | | Promotional | Dinner Meeting | Furlong, Dan | $0.00 | $0.00 | $0.00 | $0.00 | $0.00 | $0.00 | $0.00 | $0 |
| GLX-F3C-3 | 02/08/2002 | | | Promotional | Dinner Meeting | Furlong, Dan | $0.00 | $0.00 | $0.00 | $0.00 | $0.00 | $0.00 | $0.00 | $0 |
| GLX-F3C-4 | 01/29/2002 | | | Promotional | Dinner Meeting | Furlong, Dan | $0.00 | $0.00 | $0.00 | $0.00 | $0.00 | $0.00 | $0.00 | $0 |
| GLX-F3F | 01/17/2002 | | | Promotional | Dinner Meeting | Charen, Michael | $0.00 | $0.00 | $0.00 | $0.00 | $0.00 | $0.00 | $0.00 | $0 |
| GLX-F3F-2 | 02/01/2002 | | | Promotional | Dinner Meeting | Webber, Heather | $19.26 | $0.00 | $0.00 | $292.40 | $0.00 | $0.00 | $0.00 | $0 |
| GLX-F3F-3 | 01/25/2002 | | | Promotional | Dinner Meeting | Webber, Heather | $0.00 | $0.00 | $0.00 | $263.73 | $0.00 | $0.00 | $0.00 | $0 |
| GLX-F3J | 02/07/2002 | | | Promotional | Dinner Meeting | Bester, Edsel | $0.00 | $0.00 | $0.00 | $0.00 | $0.00 | $0.00 | $0.00 | $0 |
| GLX-F3J-2 | 02/06/2002 | | | Promotional | Dinner Meeting | Bester, Edsel | $0.00 | $0.00 | $0.00 | $0.00 | $0.00 | $0.00 | $0.00 | $0 |

Main Menu | Add Meeting | Edit Meeting | Profile Edit | Reports | Medsite | Fulfillment | Financial Client: Pfizer
Brand: Glucotrol
Project: 2001 Dialogue Dinner Meetings
Date: 2/14/2002
Excel Format

2302

| Fulfillment Items |
|---|
| • CSV File — 2502 |
| • Attendee CSV File — 2504 |
| • 2 day Venue Confirmation — 2506 |
| • 7-day cover memo — 2508 |
| • Cancellation Fax — 2510 |
| • Cancellation Notice — 2512 |
| • Custom Invitation — 2514 |
| • DM/Speaker Confirmation - 1 speaker — 2516 |
| • DM/Speaker Confirmation - 2 speakers — 2518 |
| • Generic Invitation — 2520 |
| • Local Speaker Thank You Letter — 2522 |
| • National/Single Speaker Thank You Letter — 2524 |
| • Reminder Fax — 2526 |
| • Request for Receipt — 2528 |

Select an Import from the table on the right to display a list of available actions which can be carried out for the selected import.

- Preparing
- Failed Prepare
- Stopped/Stalled
- Stopping
- Running
- Completed

Select an Import from the table on the right to display any available detail information for the selected import.

| | ID | Import Layout | When | Status | Progress |
|---|---|---|---|---|---|
| | 416 | Elidel Speakers 02_13_02 | 2/13/2002 2:55:15 PM | Completed | N/A |
| | 415 | Cephalin Hosts | 2/12/2002 3:32:40 PM | Completed | N/A |
| | 414 | BMS Target 02_11_02 | 2/11/2002 4:47:27 PM | Completed | N/A |
| | 413 | BMS Target 02_11_02 | 2/11/2002 4:42:16 PM | Stopping | N/A |
| | 412 | BMS ARIP Target 02_10_02 | 2/11/2002 4:06:18 PM | Completed | N/A |
| | 409 | BMS ARIP Target 02_10_02 | 2/11/2002 9:40:29 AM | Stopping | N/A |
| | 407 | Cephalon Speaker Targets | 2/1/2002 5:34:09 PM | Completed | N/A |
| | 406 | Neuro Focalin Layout 02_01_02 | 2/1/2002 10:23:38 AM | Completed | N/A |
| | 405 | Cephalon Hosts | 1/31/2002 7:24:11 PM | Completed | N/A |
| | 404 | NID 01_31_02 | 1/31/2002 5:46:23 PM | Completed | N/A |
| | 403 | Cephalon Hosts | 1/31/2002 5:29:49 PM | Completed | N/A |
| | 402 | NID 01_31_02 | 1/31/2002 4:59:57 PM | Stopped | N/A |
| | 401 | NID 01_31_02 | 1/31/2002 4:58:10 PM | Stopped | N/A |
| | 400 | Cephalon Speaker 01_31_02 | 1/31/2002 10:54:58 AM | Completed | N/A |
| | 399 | BMS Avapro 01_29_02 | 1/29/2002 11:23:09 AM | Completed | N/A |
| | 398 | NID BMS LAYOUT 01_28_02 | 1/28/2002 10:45:54 AM | Completed | N/A |
| | 394 | NS Focalin Speaker 01_22_02 | 1/22/2002 1:46:02 PM | Completed | N/A |
| | 393 | AAB Targets | 1/21/2002 10:44:56 AM | Completed | N/A |
| | 391 | Allegra Target Layout 01_09_02 | 1/18/2002 7:31:02 PM | Stopped | N/A |
| | 390 | Lovenox Rep Layout 01_15_02 | 1/16/2002 3:23:23 PM | Completed | N/A |
| | 389 | Lovenox Rep Layout 01_15_02 | 1/15/2002 4:09:42 PM | Completed | N/A |
| | 387 | Neuro Speaker Layout 01_11_02 | 1/11/2002 3:20:44 PM | Completed | N/A |
| | 386 | Allegra Target Layout 01_09_02 | 1/10/2002 7:05:32 PM | Stopped | N/A |
| | 385 | Allegra Rep Layout 0108 | 1/8/2002 2:01:43 PM | Completed | N/A |
| | 384 | Resp Skin Reps 0107 | 1/7/2002 10:23:20 AM | Completed | N/A |
| | 383 | Resp Speakers 12_31 | 12/31/2001 1:09:54 PM | Completed | N/A |
| | 382 | BMS Target Meet Layout | 12/21/2001 10:17:40 AM | Completed | N/A |
| | 381 | Ritalin Speaker Layout | 12/17/2001 1:16:01 PM | Completed | N/A |

FIG. 30

Basic | Preview Columns | Raw Columns

Save

Name: Layout for AAB Obesity part 2

Description: AAB Obesity Part 2 Layout

First Row Header:

Import Template: AAB Target Layout

Description:

FIG. 31

Basic | Preview Columns | Raw Columns

Save

AAB Obesity Part 2

User-Defined Layout Columns membercode
membername
Column 3
menumber
lastname
firstname
middlename
street1
street2
city

(19) Items Listed

Column Name:

Add  ✕Delete

Developer-Defined Template Columns

Map To: [None]

Note: Required Field are Prefixed with *

Description:

| Main Menu | Setup | Data Entry | Reports | Financial | Admin |

Polling Question Setup

Please enter the text of your question:

> Are you equipped to manage clinical trials?

Please enter the text for the Answers to this question:

> YES
>
> NO

Add Answer

Please enter the text of your question:

> Are you interested in conducting clinical trials in the area of pediatric dermatology?

Please enter the text for the Answers to this question:

> YES
>
> NO

Add Answer

Save and Add Question    Save and Exit

FIG. 32

| Main Menu | Setup | Data Entry | Reports | Financial | Admin |

External Site Setup

Please enter text for external site caption:

Please enter the text for the closing page of the external site:

```
<html xmlns:o="urn:schemas-microsoft-com:office:office"
xmlns:w="urn:schemas-microsoft-com:office:word"
xmlns="http://www.w3.org/TR/REC-html40">
<head>
<meta http-equiv=Content-Type content="text/html; charset=windows-1252">
```

Please enter any text you would like to show above the data entry page:

```
<html xmlns:o="urn:schemas-microsoft-com:office:office"
xmlns:w="urn:schemas-microsoft-com:office:word"
xmlns="http://www.w3.org/TR/REC-html40">
<head>
<meta http-equiv=Content-Type content="text/html; charset=windows-1252">
```

Do you wish to include "Other" as a category? ● Yes ○ No

[Save]　　[View Thank You]

AAB Data Entry

A B C D E F G H I J K L M N O P Q R S T U V W Y Z

| # Records | Member Name | Address | Decile |
|---|---|---|---|
| 0 | Abberbock, Gary | 1911 60th St<br>Brooklyn, NY 11204 | 8 |
| 8 | Abbott, Bernard | 9406 Goddard Court<br>Lanham, MD 20706 | 9 |
| 0 | Abellera, Nilda | 2350 Mc Kee Rd Ste A-1<br>San Jose, CA 95116 | 8 |
| 0 | Abich, Georgina | 1024 E Jersey St<br>Elizabeth, NJ 07201 | 8 |
| 0 | Aboosi, Ali | 599 N Church St<br>Mt Pleasant, PA 15666 | 9 |
| 0 | Abouelsou, Mahmoud | , OH | 9 |
| 0 | Abraham, Anes | 1521 N 10th St<br>Blytheville, AR 72315 | 8 |
| 0 | Abraham, Sasha | , NY | 8 |
| 0 | Absalon, Benito | , DC | 8 |
| 0 | Adams, Craig | 364 Honeysuckle Rd<br>Dothan, AL 36305 | 8 |
| 0 | Adams, Scott | , MO | 8 |
| 0 | Adamson, France | 1237 E. Main St.<br>Alhambra, CA 91801 | 8 |
| 0 | Adan, Donte | , AL | 8 |
| 0 | Adigopula, Bina | 5565 Grossmont Center Dr<br>La Mesa, CA 91942 | 9 |

Main Menu | Setup | Data Entry | Reports | Financial | Admin

| Main Menu | Setup | Data Entry | Reports | Financial | Admin |

DEFINITIONS

| Market: | Total Unique Nominees: | Friends: | Influencers: | Referers: |
|---|---|---|---|---|
| ALL MARKETS | 788 | 430 | 319 | 273 |

FIG. 35

| | Main Menu | Setup | Data Entry | Reports | Financial | Admin |
|---|---|---|---|---|---|---|

Advanced Health Media
2840 Morris Avenue
Union, NJ 07083
Tel 908-687-3888
Fax 908-687-7383
www.ahmdirect.com ☒ Excel

DEFINITIONS

ALL MARKETS - ALL - 1190 Nominations

| RecNum | Last Name | First Name | WTD | AVG | ALL RAW | F RAW | I RAW | R RAW | O RAW | Street 1 | Street 2 | City | State | Zip | Affiliation | Phone Specialty |
|---|---|---|---|---|---|---|---|---|---|---|---|---|---|---|---|---|
| 1 | Spraker | Mary | 66 | 8 | 8 | 0 | 1 | 4 | 3 | 1365 Clifton Road NE | Suite A1400 | Atlanta | GA | 30322 | Emory Clinic | 7 3 |
| 2 | Mallory | Susan | 62 | 8 | 7 | 0 | 3 | 3 | 1 | One Children's Place | Suite 3N48 | Saint Louis | MO | 63110 | St Louis Children's Hospital | 4 4 |
| 3 | Barnet | Nancy | 45 | 9 | 5 | 0 | 1 | 2 | 2 | | | Fresno | CA | | | |
| 4 | Orlow | Seth | 40 | 8 | 5 | 0 | 1 | 2 | 2 | 9 E 96th St Apt 11A | | New York | NY | 10128 | | 2 5 |
| 5 | Nguyen | Quan | 40 | 10 | 4 | 0 | 0 | 2 | 2 | 11160 Warner Ave | STE 201 | Fountain Valley | CA | 92708 | | 8 9 |
| 6 | Paller | Amy | 36 | 9 | 4 | 0 | 0 | 2 | 2 | 2300 N Childrens Plaza #107 | | Chicago | IL | | Childrens Memorial Hospital | 7 8 |
| 7 | Alavi | Rowshan | 36 | 9 | 4 | 2 | 2 | 0 | 0 | 1400 S 5th St. | | Phila., | PA | 19146 | | 4 |
| 8 | Honig | Paul | 36 | 9 | 4 | 0 | 1 | 2 | 1 | | | Philadelphia | PA | | CHOP | |
| 9 | Ngo | Nancy | 34 | 8 | 4 | 2 | 2 | 0 | 0 | 2408 Pecan St | | Nederland | TX | 77627 | | |
| 10 | Braye | Edward | 34 | 8 | 4 | 2 | 2 | 0 | 0 | 8765 9th Ave | | Port Arthur | TX | 77642 | | |
| 11 | Caputo | Raymond | 32 | 8 | 4 | 0 | 1 | 2 | 1 | 960 Johnson Ferry Ne-2 | | Atlanta | GA | 30342 | | |

| Main Menu | Setup | Data Entry | Reports | Financial | Admin |
|---|---|---|---|---|---|

Advanced Health Media
2840 Morris Avenue
Union, NJ 07083
Tel 908-687-3888
Fax 908-687-7383
www.ahmdirect.com ☒ Excel

DEFINITIONS

ALL MARKETS - Friend - 435 Nominations

| Last Name | First Name | RAW | WTD | AVG | Street 1 | Street 2 | City | State | Zip | Affiliation | Phone | Specialty | Decile |
|---|---|---|---|---|---|---|---|---|---|---|---|---|---|
| Haack | Susan | 2 | 18 | 9 | 1008 Cherry | | Tulare | CA | 93274 | | (209) 686-3824 | PD | |
| Alavi | Rowshan | 2 | 18 | 9 | 1400 S 5th St. | | Phila., | PA | 19146 | | | GP | 9 |
| Ituriaga | Angeline | 2 | 18 | 9 | | | | CA | | | | PD | |
| Pamaran | Maria | 2 | 18 | 9 | | | Lakewood | CA | | | | PD | |
| Brave | Edward | 2 | 17 | 8 | 8765 9th Ave | Suite 102 | Port Arthur | TX | 77642 | | | PD | |
| Martin | Fe | 2 | 17 | 8 | 2001 Ninth Avenue | | Port Arthur | TX | 77640 | | | PD | |
| Ngo | Nancy | 2 | 17 | 8 | 2408 Pecan St | | Nederland | TX | 77627 | | | PD | |
| Tangpricha | Vithavas | 1 | 10 | 10 | 4209 St Clause Ave | | New Orleans | LA | 70117 | | (504) 944-0144 | PD | |
| Gnoci | Ashok | 1 | 10 | 10 | | | | NY | | | | PD | 9 |
| Nguyen-Mo | Tramy | 1 | 10 | 10 | | | | CA | | | | PD | 10 |
| La | Trung | 1 | 10 | 10 | 14571 Magnolia Street | Suite #210 | Westminster | CA | 92683 | | 714-894-6264 | PD | 10 |
| Leduc | Xuanto | 1 | 10 | 10 | 11160 Warner Ave #207 | | Fountain Valley | CA | 92708 | | (714) 841-7705 | PD | 10 |
| Oca | Corazon | 1 | 10 | 10 | 11160 Warner | Suite 219 | Fountain Vly | CA | 92708 | | (714) 966- | PD | |

FIG. 38

| Main Menu | Setup | Data Entry | Reports | Financial | Admin |
|---|---|---|---|---|---|

Polling Question Results
Are you equipped to manage clinical trials?
| YES | 33 |
| NO | 81 |

Are you interested in conducting clinical trials in the area of pediatric dermatology?
| YES | 52 |
| NO | 64 |

Respondents who are both Interested and Equipped
| 30 |

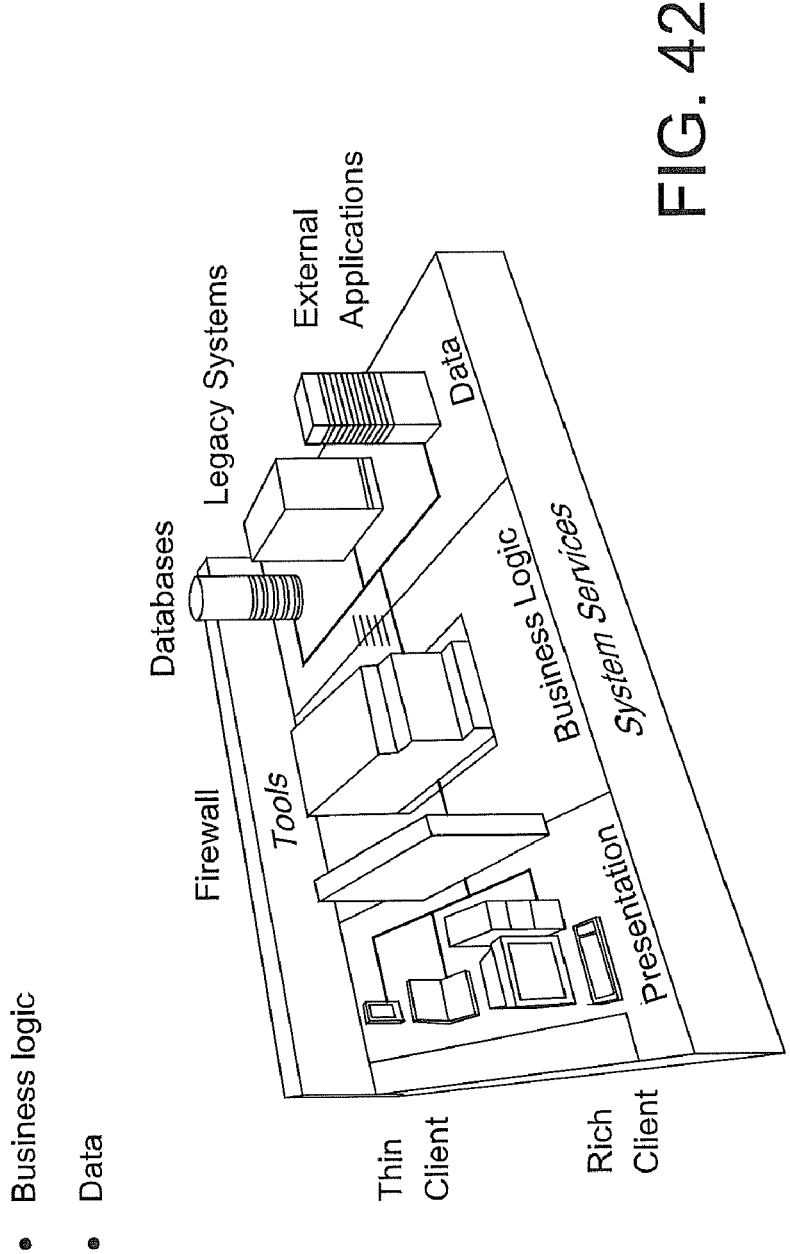

SYSTEM AND METHOD FOR A PLANNER

CROSS-REFERENCE TO RELATED APPLICATIONS

This application claims priority to U.S. Patent Application Ser. No. 60/408,066 filed on Sep. 4, 2002, entitled "System and Method For A Planner," the entire disclosure of which is incorporated herein, as if set forth in its entirety.

FIELD OF THE INVENTION

The invention relates to a planner, and, more specifically, to a system and method for generating and planning events, meetings, or related series of meetings.

BACKGROUND OF THE INVENTION

Today's business environment demands that effective interactions occur between business principals and management, peers, subordinates, supporting departments, suppliers, customers, clients, and authorities. Often, these interactions are organized as meetings between individuals or groups at various locations, and under varying circumstances. The planning and execution of such meetings, and the associated logistics, can become very disorganized and costly if important parameters are missed, if records are lost, or if the meeting planning becomes so complex that many meeting staff members need be employed to realize the event. Additionally, the organization and accounting of costs associated with the organizing of the event, the event location rental, the payment of speakers, the cost of services, such as food, lodging, administrative cost, mailings, to mention a few, are often overlooked, not well controlled, or badly managed and/or recorded. One criticism that meeting planners and attendees often express concerns the distribution of basic updated information concerning a meeting. For example, as meeting planning becomes more mature, problems may arise with venue, the availability of speakers or attendees, or services, such that the place, time, and content of a meeting may change. Dissemination of this basic knowledge to all who are interested in a meeting is key to maintaining coherency in planning and harmony among planners, customers and attendees alike. Channels of communication between planners in different companies and divisions in different cities is an additional problem that must be overcome.

Thus, there is a need for an invention that provides an integrated solution for event planning, organization, execution, and cost accounting. The present invention attempts to address these concerns by providing an integrated, remote, software application that can assist event planners in conceptualizing, organizing, realizing, and monitoring event planning and execution, and data gathering.

SUMMARY OF THE INVENTION

The present invention includes an planner apparatus. The planner apparatus includes a project management module, wherein at least one information item associated with the event is generated, an event logistics module, wherein at least recruiting of individuals for attendance at the event, selection of venue and speakers for the event, and travel logistics for the event, in accordance with the at least one information item, are monitored, at least one database, wherein the at least one information item, and wherein at least one of the recruiting, venue, speakers, and travel logistics are stored, a fulfillment request module, wherein fulfillment of tasks associated with the at least one database is performed, and a reporting module, wherein data associated with the event, in accordance with the at least one information item and at least one of the recruiting, venue, speakers, and travel logistics, is provided to a user.

The present invention additionally includes a planning system. The planning system includes at least one business rule remote from at least one client, a meeting editor, wherein at least one meeting may be generated for the at least one client by the meeting editor in accordance with at least one of the at least one business rule, and at least one tracker communicatively connected to the meeting editor, wherein the at least one tracker tracks at least two data items selected from the group consisting of invitees to at least one of the at least one meetings, respondents to invitations to the meeting, at least one speaker of the meeting, at least one host of the meeting, finances of the meeting, and a venue of the meeting, and wherein the at least one tracker communicates the at least two data items with the meeting editor.

The meeting editor may include a meeting set-up module for setting up each meeting, a meeting manager for managing each set-up meeting, a fulfillment request form manager, a reporter, an attendance listing manager, an invitee listing manager, a speaker listing manager, task listing manager, or a security listing manager, and a selector for selecting at least one of the invitees to at least one of the at least one meetings, the respondents to invitations to the meeting, the at least one speaker of the meeting, the at least one host of the meeting, the finances of the meeting, and the venue of the meeting for tracking by the tracker.

The at least one tracker may include at least one database for each meeting. The at least one database may include at least one data attribute selected from the group consisting of a meeting code for the meeting, and at least one of a meeting date, a meeting time, a meeting type, a meeting status, a meeting number, a client meeting number, or data attributes of the at least one speaker and the venue, wherein at least one of the at least one speaker and the venue are relationally linked to at least one of the meeting code and the meeting date. The planning may additionally include a finance tracker.

The present invention may additionally include a method for planning a meeting utilizing an application remote from a planner of the meeting. The method may include the receiving of a logging onto the application, receiving a meeting identifier, receiving a selection of at least one venue for the meeting, receiving an identification of participants for the meeting, sending the participants invitations to the meeting, assembling statistics on replies to the invitations, sending reminder notices to the participants upon the assembling of statistics, tracking expenses for the meeting, and generating reports concerning the meeting.

BRIEF DESCRIPTION OF THE DRAWINGS

Understanding of the present invention will be facilitated by consideration of the following detailed description of a preferred embodiment of the present invention taken in conjunction with the accompanying drawings, in which like numerals refer to like parts and in which:

FIG. 5 is an embodiment of a display of the current invention;

FIG. 9 is an embodiment of a display of the current invention;

FIG. 12 is an embodiment of a display of the current invention;

FIG. 16 is an embodiment of a display of the current invention;

FIG. 17 is an embodiment of a display of the current invention;

FIG. 18 is an embodiment of a display of the current invention;

FIG. 19 is an embodiment of a display of the current invention;

FIG. 20 is an embodiment of a display of the current invention;

FIG. 21 is an embodiment of a display of the current invention;

FIG. 22 is an embodiment of a display of the current invention;

FIG. 23 is an embodiment of a display of the current invention;

FIG. 25 is an embodiment of a display of the current invention.

FIG. 28 is an embodiment of a display of the current invention;

FIG. 30 is an embodiment of a display of the current invention;

FIG. 31 is an embodiment of a display of the current invention;

FIG. 32 is an embodiment of a display of the current invention;

FIG. 33 is an embodiment of a display of the current invention;

FIG. 34 is an embodiment of a display of the current invention; and

FIG. 35 is an embodiment of a display of the current invention.

FIG. 36 is an embodiment of a display of the current invention;

FIG. 37 is an embodiment of a display of the current invention;

FIG. 38 is an embodiment of a display of the current invention;

FIG. 42 is a block diagram of the present invention.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical system and method. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure hereinbelow is directed to all such variations and modifications to planning technologies known, and as will be apparent, to those skilled in the art.

The present invention may include a plurality of tools, which may be organized, for example, in accordance with business rules, and which may include a planner, an organizer, an advocate and polling builder, an attendance tracker, a progress tracker, and/or a financial tracker, and which may include at least one of these tools within a communication tool for events and projects, such as corporate meetings, presentations, discussion groups, product development meetings, or any assemblage of people at a place for a common purpose. The present invention may allow designated users to plan and organize an event or project, such as a meeting, on-line over a network, such as the internet, such as by communicating with a remote planning system and/or advocate builder. The present invention may utilize the communication provided by the network, in conjunction with an organized hierarchy of at least one database, in order to allow the organizers of an event to centralize activities necessary to execute a successful meeting or project, for example, into a paperless planning system, thereby improving output and operational efficiency of personnel, such as planning staff, and thereby reducing planning time and costs.

The present invention may enable users to access at least one database to generate, for example, multiple events for different products or projects within an enterprise, such as a client, to invite guests and speakers to at least one of the events, to establish a venue and the support services required at the venue, to track the cost and status of an event, and to permit message-level communication between pre-selected parties having system access. The present invention may be utilized by multiple organizations, wherein each organization may have multiple products or other motivations for multiple events. The users of the system may include, for example, system administrators, meeting planners, meeting attendees, speakers, service suppliers, or other individuals or entities that can contribute to the successful planning and execution of an event.

Figure 1:
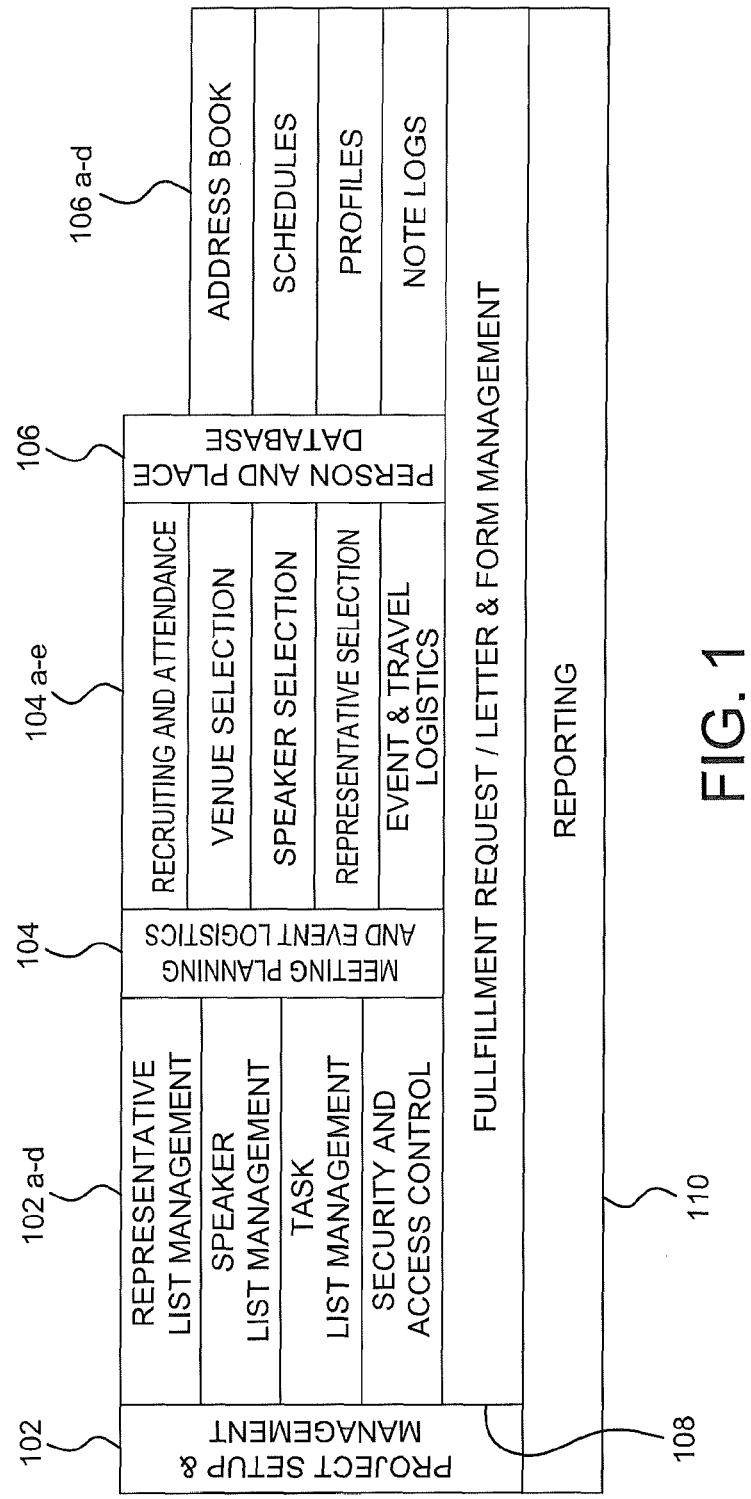
FIG. 1 is a block diagram of the present invention.

A planning system in accordance with the present invention is shown in FIG. 1. The planning system may be utilized, for example, for multiple meetings, multiple projects having multiple meetings therefor, and for multiple organizations. Users may plan, track, and/or organize information related to at least one meeting for at least one client. Clients may interact with the planning system to request planning services and acquire information related to a meeting or series of meetings, for example. Clients may additionally execute and track a meeting using the planning system. The planning system may include project set-up and/or management 102, meeting planning and/or event logistics 104, and at least one database, such as a person and/or place database 106, for example. The planning system may also include a fulfillment request form management function 108 and a reporting function 110, for example. The planning system may be, or may include, for example, a Microsoft Windows distributed internet applications architecture, as discussed further hereinbelow.

The project set-up and/or management 102 may include representative list management, speaker list management, task list management and security and access control functions 102 a-d. The meeting, planning and/or event logistics 104 may include recruiting and attendance venue selection, speaker selection, representative selection and event and travel logistics 104 a-e. The database may include an address book, schedules, profiles and note logs 106 a-d. These functions may be supported by fulfillment request, letter and/or format management 108, or reporting 110.

The planning system of FIG. 1 may include this multiplicity of integrated components and at least one logical and/or relational database. A project in the planning system may necessitate or include one or more of the function or modules of FIG. 1, depending on the requirements of the client. A project is a logical group of at least one logically related meeting. The project set-up module allows a project administrator to customize a project set-up. A project may track meetings, for example, such as meetings related to a given product of the client. A project may also include speakers, venues, client representatives, or recruitment and attendance data, of the at least one meeting, for example. Thus, for each component of the project, there may be a set of data attributes that may be tracked. Some of the data attributes for each component may be required, and others may be used at the administrator's discretion.

The planning system may utilize, for example, dynamic link libraries (DLL) that link the project definition data, such as the project administrator's choice of component and fields, and HTML, xml, or ASPX templates, for example. These DLLs may process the HTML templates before presentation to a user of the interface, replacing tags and information in the HTML template with the defining attributes captured. Thereby, the project administrator may have control of the layout and presentation of the data, and the planning system may thus ensure that capture validation and storage of data is consistent across all projects.

The meeting planner and/or event logistics 104 may include venue selection, speaker selection, representative assignment of a meeting, audio/visual (A/V) supplier selection, and recruiting and attendance, for example. Fields tracked at the meeting level, and entered to, or accessed from, the person/place database, may include meeting date and time, program type, program status, meeting number and client meeting number, for example. Further, one or more speakers may be linked to a meeting. One or more venues may be linked to each meeting, and each venue may be considered a temporary selection until confirmed. Data attributes may thus include person/place attributes, as well as a confirmation flag.

Attendees, recruits, or "targets", may additionally be associated with a meeting. A target tracker may provide an interface to maintain a list of recruits, may import target information provided by a client, may track status and contact history of the targets, may record and track contract information with a target, may record attendance data, and may be within, or associated with, the logistics 104. For each person in the target list, a flag may indicate if the person was invited, and in what capacity, such as attendee, speaker, moderator, representative, client, guest, or the like, whether the invitee has responded, the type of attendee, the number of guests, and/or the type of recruiting that was used to generate the list. Examples of the type of recruiting may include fax, telephone, representative invitation, guest invitation, and the like.

The reporting may report real time status of sponsored activities in, for example, a tabular format including event schedules, venue information, speaker information, attendance rosters, program tracking and status, and financial information. Reporting may be a real time, internet-based format for secure access from any computer having access to the network, such as the internet or an intranet, on which the planning system is resident. Users may, for example, export and download a report in Microsoft Excel format to a local machine from the reporting module. Pre-defined reports may be available for any selected period. Pre-defined reports may include, for example, multi-day reports, such as a two day report, a seven day report, or a weekly roster report. Other pre-defined reports may include, for example, an invitation report, a summary status report, a results report, an attendance roster, and/or a cumulative attendance report.

A two day report, for example, provides status information, and shows events that will occur two days from the current business date, and may include, for example, the session or meeting code, the date and/or the time of the meeting, the location of the meeting, the host or moderator, current reservations and/or actual attendance, such as for a selected period of two days. A seven day report may thus include the same status information, but for a seven day period from the present date. A weekly roster report may also include the same information but over a week's period, and for a full roster of meetings on a single project.

For example, a user may run a "2-Day Report" everyday in order to list all of the meetings occurring within the next two days. For all meetings listed, the user may print out a Venue Confirmation/Guarantee fax and Speaker Presentation Reminder, if applicable. An audio/visual company may be reminded based on this report, if needed, and final headcount may be listed on this report, for example. Confirmation faxes sent to all of the attendees, speakers, and support personnel may thus be manually or automatically sent in accordance with the report, and may ensure that all meeting parties are appraised of critical meeting parameters.

A user may run a Weekly Roster Report on a specific day, such as, for example, on each Friday. This report may show which programs may be occurring over the next 30 days. The user may generate a weekly roster report by going to the "Reports" section on a toolbar, for example, by choosing a "weekly roster report", and by entering a date.

An invitation report may include, for example, the session or meeting code, the meeting time and date and location, the host name, the date invitations were mailed, the number of invitations mailed, the number of acceptances and/or the roster returned. A status summary report may include, among other things, the session code, the date, time and location of the meeting, the host, the moderator, current reservations, actual data of attendance and the current status of all of the fields. A results report may include the rosters returned, the number of invitations mailed, the total RSVPs, the total attendance, the average attendance, as well as the session code, the date of the meeting, and the invitations returned. A hyperlink within a report may include, or provide a link to, an attendance roster which might also include the session code, the date and time of the meeting, the location, the host, contact information for the host, contact information for the moderator as well as the speaker, the participants and the addresses thereof, as well as actual attendance at the meeting. The cumulative attendance report may report over a variety of events, and may include a brand name or project name, an event ID, meeting code, date and time, names of the host and moderator and the speaker, names of the attendees and the attendees' addresses, specialties of the attendees, as well as other information relevant to a cumulative report.

The fulfillment request/letter and/or form management function 108 may include a form letter management module. This module may enable a user to combine ad-hoc queries with custom Microsoft Word document templates to produce form letters, for example. Once an ad-hoc query is designed and saved in the reporting module, it may be used as a data source for a form letter. The planning system may generate a text tag for each field in the data source to be placed in the form letter. Users may then lay out the word document and place the field tags in the correct locations. Once the template is defined, the data source may be applied to the Word template. The end results may be the presentation of the form letters to the user in Word, preferably wherein the user may make modifications to the letters before the letters are printed. Once the ad-hoc query and a template has been defined, the two may be saved together as a form letter package, for example.

The planning system also may include a finance module. This module may include tracked and/or estimated expenses. This module may track expenses at, for example, a meeting level. For each expense record, the type of expense, the status of the expense, i.e. whether it is an estimate, whether it has been paid, whether it is pending review, etc., the estimated amount of the expense, the actual amount of the expense, any comments regarding the expense, and/or relevant check numbers and check dates, may be tracked.

Security access control 102d may authenticate a user. Users of the system may log into the system via an internet portal and access the system through the protections of a user name and password, for example. In addition, the security module may provide access control once the user has been authenticated. Multiple levels of access control may be defined. For example, one level may be for system controllers and another may be for a client user. System controllers may have full access to the application to add, delete and update the data, and client users may have limited access.

An auditing function may additionally be provided. The planning system may track creations, reads, updates, additions, edits and deletions from the databases, in order to provide a history of changes for auditing. The audit log may grow very large, and thus may require periodic purging. The audit log may track systems usage and help to resolve issues regarding data quality. Each audit record may be corresponded to a field in the person or place database or in the data captured, and may include a user ID and the date and time of any modification made, along with the new value for the field.

Figure 2:
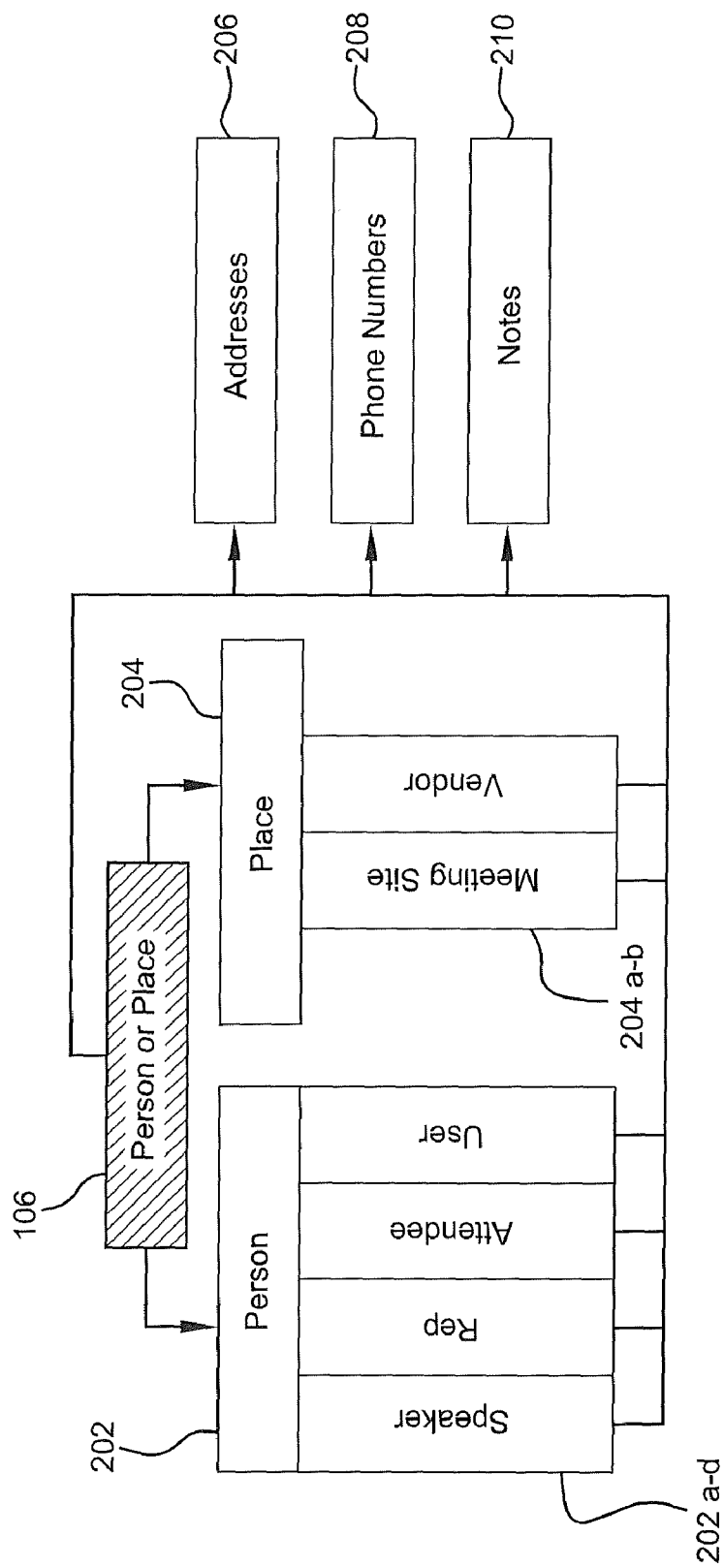
FIG. 2 is a block diagram of the present invention.

FIG. 2 represents an exemplary database, which may be, or be within, for example, a person and/or place table. The person and place table may provide a common store for any representative, speaker, moderator, attendee, audio/visual equipment or provider, and/or venue data. Providing references to people and places in a single table may provide a consistent, normalized view of the data, and may provide a common access point for critical stores of information. Each person and/or place may be stored in the person and place table/database, thereby providing a common value for all sub-systems. This common-valuing may allow analysis of speaker and attendance data across clients, brands and/or projects.

The person and place database may include the contact information, i.e. the addresses and phone numbers, of all people in and involved in a project or projects. The person and place database may abstract this contact information to provide a consistent interface for accessing the information. For example, an address for a speaker, and an address for a venue, may be stored in the predetermined table having a given structure for the particular project or meeting. This predetermined table, or given structure, may vary by client, or by project, or by meeting, for example. Each address for a person or place may be labeled with a type, such as business, home, shipping, etc. For each address, the person and place database may store street, city, name, zip code and comment data. One address for each person or place may be flagged as a correspondence or mailing or shipping address, such as for any automated form letters that may be produced as discussed hereinabove. Thus, the form letter module and the databases(s) may preferably be communicatively linked for automatic address generation for form letters, for example. Phone numbers may also be labeled by type, i.e. business, home, mobile etc., such as for automated phone dialing upon linkage to a phone system. Each phone record may contain a phone number, extension, comments, and a type, for example. The person and place note facility may provide an interface to enter free form text notes, that will be date and time stamped and linked to a person or a place. These notes may then be freely available, or available in accordance with a given security clearance, elsewhere in the planning system. These notes may be, or be used by, non-structured data that does not have a pre-specified field in the person and place database, or may be structured data for relational storage in a database, for example.

Figure 3:
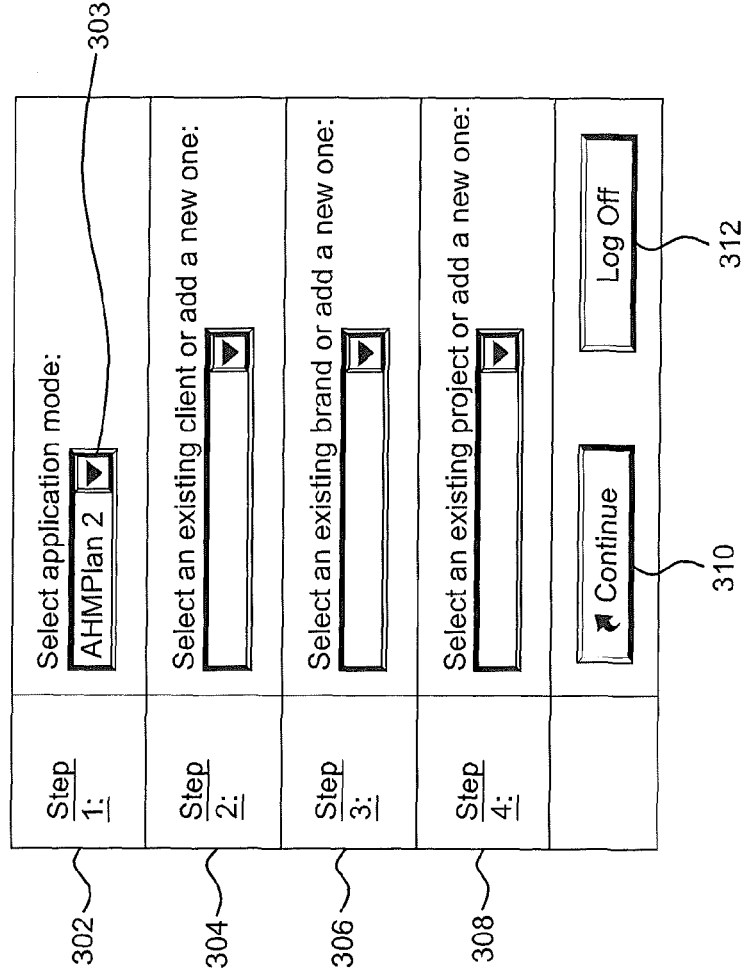
FIG. 3 is an embodiment of a display of the current invention.

In operation, a user may log-in, and that log-in may alert the planning system as to the functions, projects, or meetings, to which that user may be granted access, and, if access is granted, to what level access may be exerted. Once connected and authenticated, the planning system may offer the user a menu of available choices. FIG. 3 is an embodiment of the menu options. An application may be selected 302 using a selector 303, such as a drop-down menu, for example. If a meeting planner is selected 302 as the application, the user may enter a client name 304, a brand name 306, and/or a project name 308. Once these parameters are entered, a continue button 310 may be depressed and a new screen as shown in FIG. 4 may appear.

Figure 4:
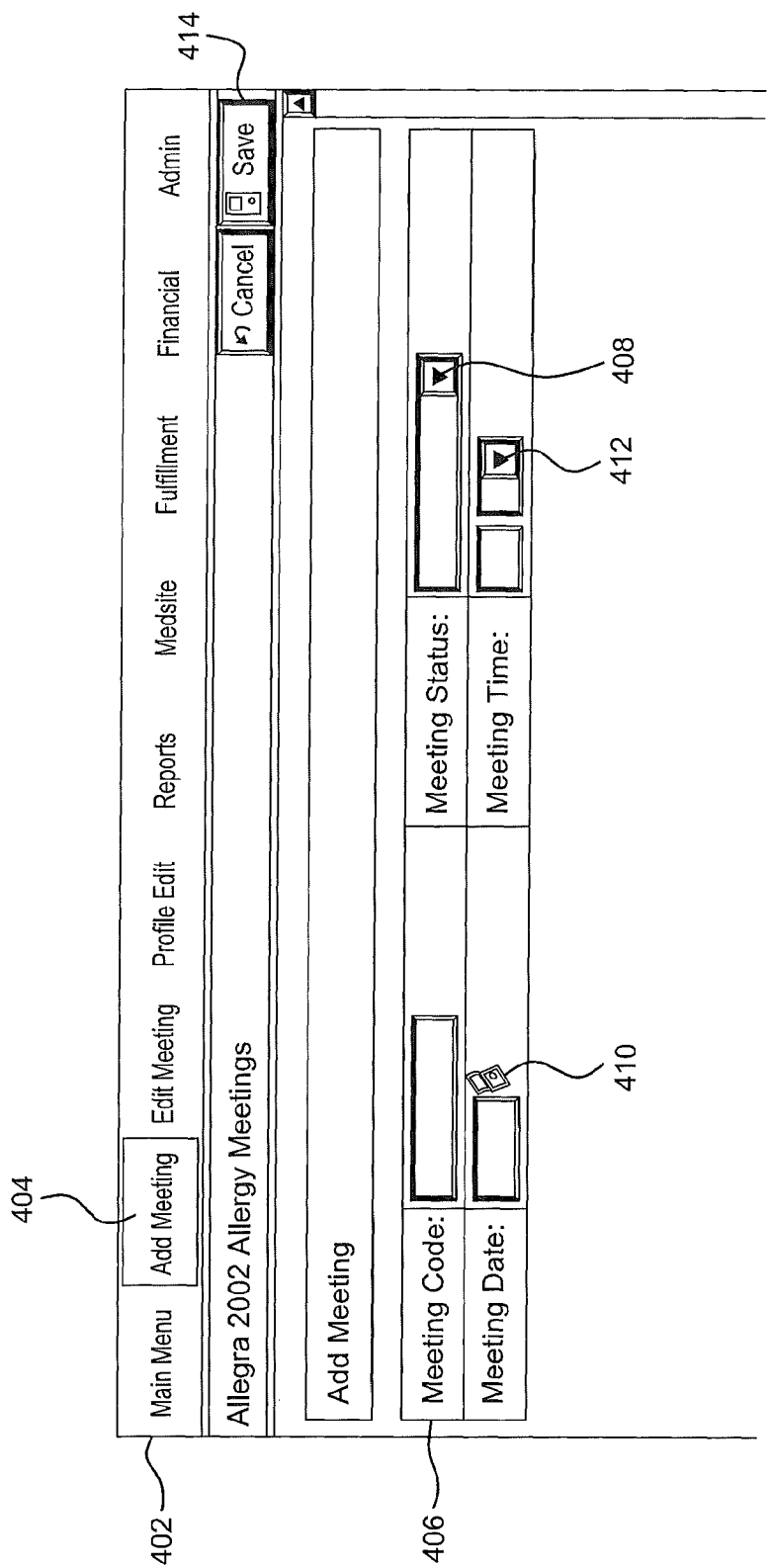
FIG. 4 is an embodiment of a display of the current invention.

FIG. 4 is an embodiment of a screen after login. The screen may be used to navigate via navigation buttons on the top of the displayed window 402, such as a tool bar. If a new meeting is to be added, the Add Meeting button 404 may be depressed, for example.

Requests for the addition of meetings may occur through the network or web-based system, and may be completed by a system user, or an account supervisor, for example. The user or account supervisor may be asked to enter a meeting code 406. Meeting codes may be determined by the account supervisor, and may contain a client's sales territory or district number, or may be automatically generated by the planning system upon generation of a meeting, for example. Meeting codes may be entered by typing directly into the meeting code box 406, or by a drop down selection from the code box 406, for example. Pull-down 408 may allow the user to select a status for the meeting. If the user does not assign a status, the status may self assign, such as "No Request". A meeting may be considered "Set-Up In Progress", for example, until all meeting details have been completed. Once the program is confirmed and all details have been arranged, the program may have status "Set-up Complete".

In order to complete meeting setup, a plurality of meeting information, such as meeting date and meeting time, may be entered. For example, to set up a meeting date, a calendar icon 410 may be used. The user may click on the calendar and then click on the date that has been selected. A meeting time may be assigned 412, such as along with a corresponding pull-down to select A.M. or P.M. After entering the above information, the user may save the screen using button 414, thereby allowing the user to move to the next screen, whereat the user may continue entering information about the meeting.

FIG. 5 is an exemplary embodiment of editing of meeting parameters. At any time after a meeting is entered, an authorized user may edit the information that was previously entered by entering the "edit meeting" mode via the toolbar button 502, for example. In addition, the user may use edit meeting to add any information that was previously unavailable. The user may be encouraged to save any changes that were made. Certain of, or all, fields depicted in FIG. 4 may be edited, or selectable via drop down windows, for example.

Exemplary data fields to be entered in FIG. 5 may include the Date 7-Day Packet Sent 550 field, and/or the 7-Day Packet Tracking Number field 552, wherein a corresponding FedEx tracking number may be entered. Also selected, such as by using the calendar icon, may be the Date Invitation Mailed 554 and the Date Attendance Roster Returned 556 fields, for example. In certain exemplary embodiments, the user may type freely in the corresponding space for meeting notes 556, and via notes, or via a dedicated meeting email server listing, for example, the user may thereby communicate with other individuals interested in the meeting. For example, a message left in the meeting notes area may be read by other individuals with access to the meeting planner. A Feedback Report Returned status 560 may be automatically assigned as "no", unless an entrant uses the pull-down and selects "yes", for example. A Speaker Status 610 may be entered via a pull-down throughout the meeting planning process to assign a speaker status. If the meeting date has not been confirmed with the speaker, the speaker may be "pending". If the date has been confirmed, the speaker status may be "confirmed". Speaker Travel 612 may be recorded via, for example, a pull-down to assign personnel to handle the speaker's travel arrangements. A speaker may be confirmed 614 by using a pull-down for the appropriate method of confirmation, such as a phone conversation, fax, e-mail, etc. A date that the speaker was confirmed 616 may be entered via the calendar icon, for example. Speaker Notes may be typed freely in the corresponding space for speaker notes 618, for example.

A contract status field may be automatically populated, such as with "Initial Request". When the user changes the status to "Contracted", the screen may change to show more venue details. A venue may be considered contracted when a received and/or signed meeting confirmation from the venue is obtained, and a date contract returned field may be populated on the date of receipt of a received and/or signed contract from the venue.

Returning now to FIG. 5, the Meeting Type 504 may be selected from the pull-down options and may identify the business type of the meeting. The meeting format 506 may be selected from the pull-down options and may indicate the format of the meeting, such as a dinner, breakfast, or lunch meal type, a conference, seminar, or other meeting type. Meeting topic 508 may be selected from the pull-down options and may be related to one of the products, or areas of research, or any other activity that a business entity may engage. Note that a meeting type, format and topic selections may be pre-defined by an account supervisor at the start of a project.

A Date Request Received 510 may be entered, such as using the calendar icon, to record the date that the meeting request was received, such as in order to assist the user in determining the amount of time it has taken to complete the meeting set-up. A host may be added in the add new host field 512. To add a host, the user may click on the Add New icon, and/or may search an underlying host database to find a host, or may add a host to the database so as to allow for selection of that host from the database. Of additional note, a user may perform a realistic search, which may automatically reject nonsensical searches, and which may include wildcards, for any field in use in the present invention. If no results are found for the search, the user may add, and then select, the desired search person, place, or entity. Thereby, the present invention provides a universal, one touch (or click), search function, followed by a one-touch change, add, or select function. If a name is already entered and the user wants to change it, the user may first delete the entered name by clicking on the X next to the appropriate field, for example. The Host Voicemail 514 may automatically populate the host's voicemail extension when that information is added into the host profile, for example. The target list included 522 may utilize the pull-down to select "yes" if the meeting host has included a target list with his/her meeting request. If this information is not updated, the system may automatically assign as "no".

The Adding Additional Point Person, which is, in one embodiment, a coworker of the client named as the "point person", may serve as an additional point of contact. The additional point person may serve as a default cc: to assist the point person. The Additional Point person may be added to the meeting in the same fashion as set forth hereinabove. The contact 518 may be an employee or contractor of the host, responsible for confirming the meeting logistics. Contacts may be added to the meeting in the same fashion as the host. Of note, all persons may be added to a meeting using the single touch search, and the single touch add, select, or change, as discussed hereinabove. A moderator 520 may be, for example, a speaker that is employed by the customer. Within the moderator field box, the user may have the option to select or delete the current moderator. The moderator may be added to the meeting in the same fashion as the host. The territory number 524 may utilize a pull-down to select the appropriate number, which may have been preloaded by a system administrator. The contract location description field 526 may utilize the pull-down to select the appropriate description.

Figure 6:
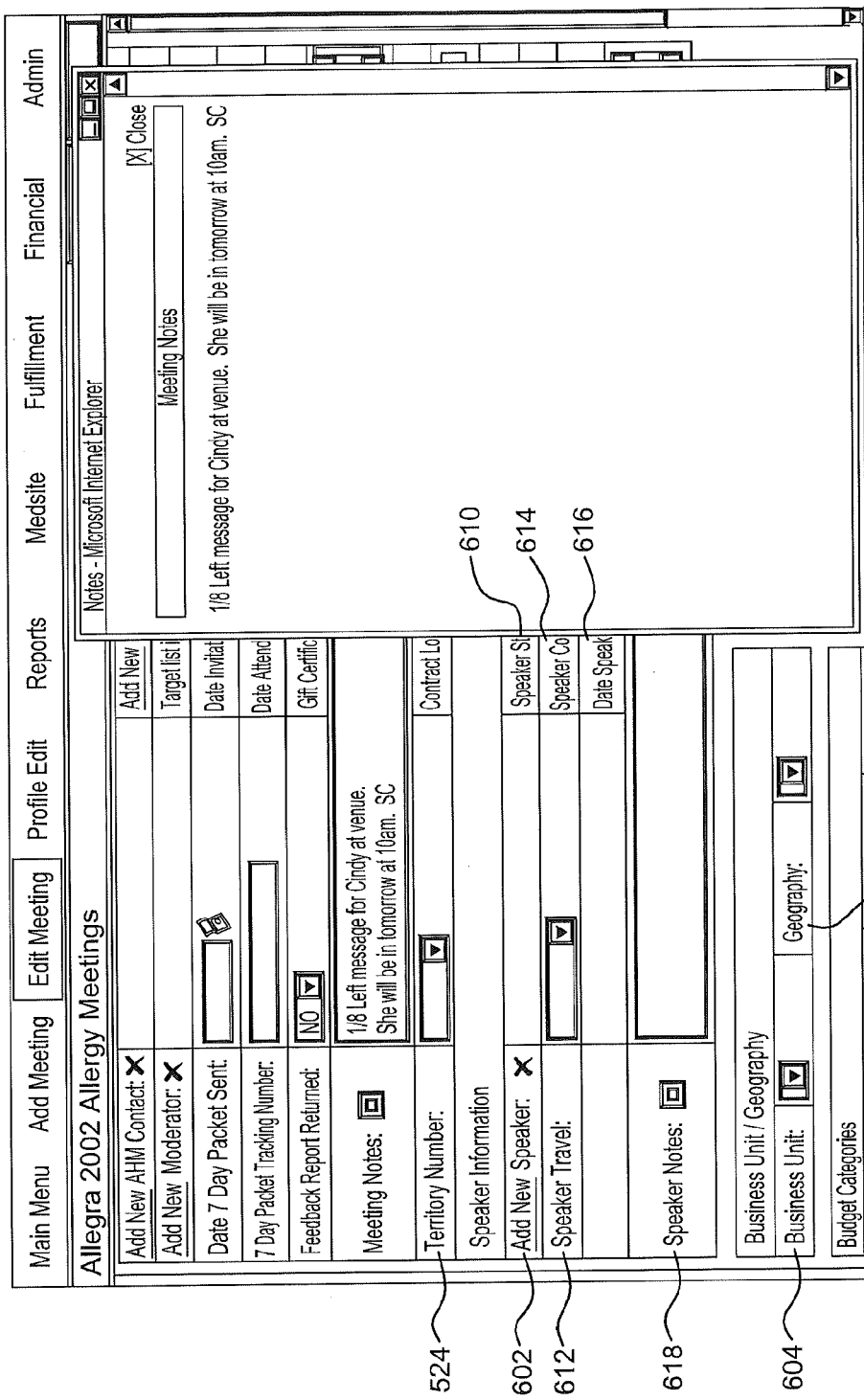
FIG. 6 is an embodiment of a display of the current invention.

As discussed hereinabove, FIG. 6 is an exemplary embodiment of the present invention. The speaker field 602 may contain the name of the speaker for a program. The speaker may be, for example, a visiting faculty member, or other client employee or contractor, that has been trained by a client to speak on behalf of the client. The speaker may be added to the meeting in a similar manner as the host. The business unit field 604 may utilize a pull-down menu selection. The geography field 606 may utilize a pull-down to assign the correct location of the business unit involved. The venue field, such as that at which the speaker will speak, may be the location in which a meeting will take place, such as a restaurant, hospital, hotel, etc. Once a reservation has been made, the venue may be marked "reserved" in the system.

A target list may be included with a meeting request, and each target may be entered in the "Participant" section of the meeting planner. For example, if the meeting was a conference of medical specialists, a target list may be a list of medical personnel that a meeting host might like invited to the program. To enter a target list, the user may select a meeting to affiliate with the target list. At the top of the meeting screen, the user may go to the participant section. To add a New Participant the user may click on an "Add New Participant" button located, for example, in the top right hand corner. An icon may be used to indicate the function, such as, for example, a red plus symbol. Depressing the icon may open a search screen, and the user may search for a target in the same fashion that a search for a host or speaker is performed. If the search is successful, the name and address may be added to the invitation list by depressing an "Add Participant" button. If the user's search is unsuccessful, the user may depress the "Add New" button and create a new profile for that target.

As a user is entering the target list, the system may prompt the user when a pre-determined participant limit is reached. In the case of entering a target list, a user may override the limit and continue entering names. Thus, a particular meeting may have a select number of participants ("Yes" responses) allowed to attend a program, and this limit may be shown at the top of the Participant Screen. There may also be notes in the Participant Notes section indicating a deviation from the limit listed at the top of the screen. Notes about participant limits may override a pre-determined participant limit. Participants may also be deleted. To remove a Participant, a user may click on a delete icon, such as, for example, an "X", and may thereby request the deletion function. The user may then be queried concerning the desire to actually delete.

A target list may, for example, be imported into a meeting. To import a list from an existing planner target group, such as a target list for a given district, territory, group name, or group attribute, the user may go to the meeting's participant screen. The user may then click the territory import, contract location import, or import group to begin import. The system may ask the user to confirm that the user wants to complete this import for this meeting to insure that the user has the desired meeting and group selected. If correct, the user may select "Submit". The planning system may then import all names affiliated with that territory/contract/group. For example, attendee lists may be downloaded in a comma separated value (csv) format. A downloaded attendee address list in a csv format file may then be found, for example, in the fulfillment module, as discussed further hereinbelow, such as in csv lists 706, 708. The file may be additionally be downloaded into an Excel csv file by choosing a file name from a menu that appears as "Save Target As".

If a meeting host wants to only invite specific people from the list previously imported, the user may choose the "mass select" function, for example. Mass Select may default to all names being a "do not invite". The user may then select those targets that the host does want to invite. Once the user selects and saves the names desired, and the names left as "no" may be removed from the list, thereby leaving only those names that selected as yes.

The present invention may allow for the inviting of guests to a meeting by assembling and entering responses to invitations (RSVPs). Invitations may provide the invitee with a fax back, or email back, request, ("fax back" response) for example. Once the invitee responds, the fax back or email back is considered a response or RSVP. Invitees may note on a fax whether or not they will be attending a program, and may provide some profile information with the RSVP, such as an address, phone, fax, Social Security number, or TaxID, for example.

If a fax back response is positive, the user may ensure that the information on the fax back form is reflected in the invitee's profile, i.e. medical suffix, address, phone, fax, SS# or TaxID. The user may then save the response by clicking on the "Edit" icon near the participant's name. The user may use a drop down box under attendance status to choose "Yes" to indicate the fax back RSVP was positive. If a guest count was requested on the fax back form, the user may enter the number indicated in the guest count field and send a fax or email confirmation, for example. A confirmation fax may be sent by the user by first selecting to send an e-fax, editing a reply, and delivering the e-fax via electronic mail, for example. Once the e-fax is successful, the user may initial and date the RSVP and file it in an appropriate folder, for example. Optionally, the user may send a mail confirmation, which may be performed by printing the edited fax message, and printing the letter on letterhead for hand mailing.

If the fax back RSVP is negative, the user may ensure that the information on the fax back form is reflected in the invitee's profile, i.e., medical suffix, address, phone, fax, SS# or TaxID. The user may save the response by clicking on the "Edit" icon near the participant's name to provide editable fields. The user may then utilize the drop down box under attendance status and choose "No" to indicate a negative response. The user may then file the negative RSVP in an appropriate folder.

The user may be able to add, edit or search a profile to add to a list. When a user clicks on "Add New" button in meeting list, for example, a search box may appear. A user may use a wild card search when the user is uncertain of an exact spelling of an attendees or speaker's name, for example. The asterisk may represent the wild card and can be used as a prefix, suffix or both. For example, using the wild card as a suffix for Jon*, will result in a search for any combination of letters using "Jon" as the first 3 letters of the field searched. Jon, Jonah or Jonathan would all be possible outcomes for this wild card search. If the user knows the city or state for the person/place entry, the user may enter that information as well. Providing additional information may help reduce excess results to thereby produce a more efficient search.

If a search is successful, a listing may appear as a set of matches to a search. To make a selection, the corresponding "Edit and Add to Meeting" tab may be selected. A profile of the individual may appear upon selection to allow the user to verify that that the individual and all of the relevant information is accurate. At any point in the process the user may use the "back" button at the top of the page to bring the user back to the search screen to, for example, create another search selection.

If the record that the user is seeking does not appear in the search results, a user may utilize the "Add New" button. When the user selects add new, a blank profile screen may appear. The user may enter all appropriate information, such as name, address, phone, fax, and the like, and may save. The user may then select the "add to meeting" button by using the icon at the top of the profile screen, for example.

Figure 7:
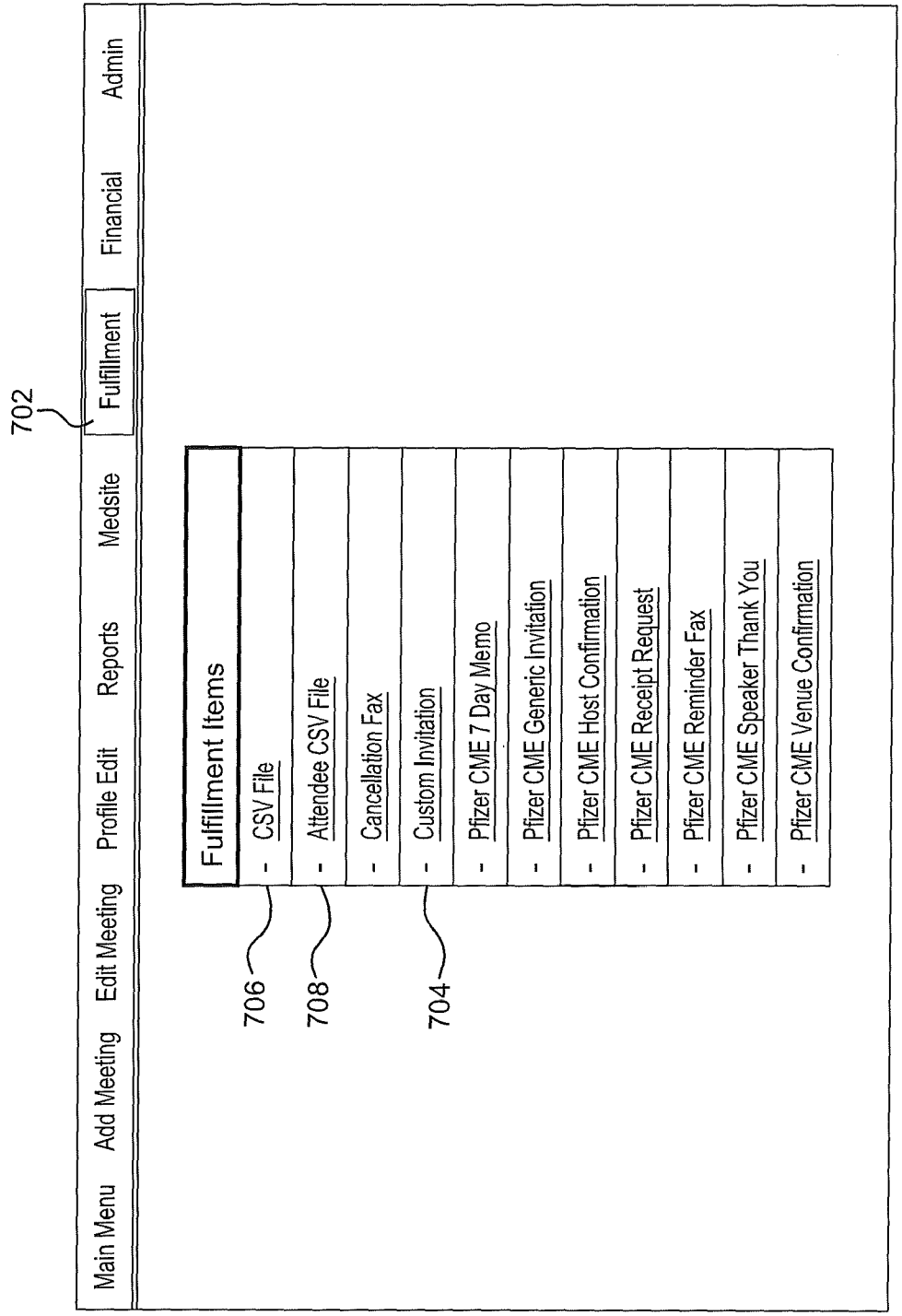
FIG. 7 is an embodiment of a display of the current invention.

The present invention may be utilized to print invitations to a meeting attendee. Generally, printed invitations may be sent, for example, about 4 weeks before a program date. The invitations may be generated from the "Fulfillment" module in the planning system. FIG. 7 embraces one embodiment of the invention showing a the fulfillment tool bar button 702. A user may print and send such an invitation by choosing the meeting desired, such as by selecting the correct meeting code from the drop down list provided in the fulfillment section. For example, a custom invitation may be sent by selecting the appropriate drop down menu selection 704. Invitations may then be printed on designated letterhead.

Reminder, or other, faxes may be sent through the use of the present invention, in accordance with a manual trigger, or an automatic trigger. An automatic trigger may be, for example, time triggered or event triggered. A time trigger may be automatically generated on a certain date, or at a certain time. An event trigger may be an event, such as a change in meeting time, completion of a setup, etc. These triggers may be automatically entered to the system, and the system then tracks until the event occurs, and, upon occurrence of the event, the faxes (including emails or telephone calls) are automatically generated. Events, or time, triggers may trigger faxes only to persons having a certain status for a given meeting in the database. For example, the event "setup complete" may trigger an event fax to the meeting host. Alternatively, for example, on a specific day, such as, for example, a Monday, an account coordinator, or an automated message generator operating on a triggered basis, may send reminders, cancellations, postponements, attendance rosters, confirmations, invitations, or other document templates that are populated by merging information from a database for manual or automated distribution, by fax, email, automated telephone call, or the like, to participants, speakers, host, additional point persons, speakers, audio/visual suppliers, or the meeting attendees, for example, such as for the meetings coming up that week. If a meeting is occurring over the weekend or on a Monday or Tuesday, the present invention may send the reminder faxes or emails Thursday or Friday, for example. In addition, reminder faxes can be e-faxed from the computer in the same fashion as confirmation faxes, for example. An automatically generated fax, email, or the like, may be autofilled from the information in the database, such as by an automated merge, such as by autofilling the fax number, name, position, and/or status (host, attendee, etc.) in accordance with a given event or time.

After a meeting has occurred, the user may wish to record return rosters to thereby provide a listing of each person who actually attended the meeting. Upon receipt of a return roster, the user may click "Edit" in the invitee's record in the Participant Screen and click "Yes" in the actual attended section of the record, for example. The user may save that information and enter the roster return date on the meeting information screen.

Expenses for a meeting may additionally be tracked through the use of the present invention. The user may perform this function by opening the project, clicking on the financial button, choosing "Expense Register", clicking "Add New Expense", selecting the meeting code, and selecting the charge type (i.e., venue, outside AV . . . ) or by entering the Expense Type (Visa), or the expense category (F&B, Room Deposit . . . ), or by entering the charge amount, such as including a decimal (100.00), and/or by entering any notes pertinent to the charge. The user may save this information for permanent record keeping.

Figure 8:
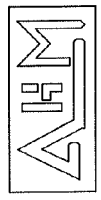
FIG. 8 is an embodiment of a display of the current invention.

FIG. 8 is an embodiment of a screen after login. The tool may be chosen at 802. A client may be chosen in 804. An existing brand or product which is the subject matter of the meeting may be chosen in 806. An existing or new project for the meeting may be chosen in 808. In the example of FIG. 8, a meeting planner was chosen, the client is Pfizer, the brand name is Glucotrol®, a product of Pfizer®, and the project is a dinner meeting entitled 2001 Dialog Dinner Meeting.

FIG. 9 is an embodiment resulting from depressing the edit meeting button 902. FIG. 9 is a list of all meetings for the Glucotrol® 2001 Dialog Dinner Meetings. Various meeting codes 904 are displayed for the meetings displayed on the FIG. 9 meeting list. Each meeting may have an individual code which specifically identifies it. The date and scheduled time for the meeting 906 is also listed for each meeting code. The status of the meeting may also be shown 908 as being either completed, canceled or in set-up, for example. The host of the meeting 910 is listed as an individual who is sponsoring the meeting. The moderator 914 is also listed for each meeting. A first, second and third speaker 916 may also be listed for each meeting. The meeting location 918 is provided as a city or state, and venue 920 provides the specific business location for the meeting. The column 922 audiovisual allows the company providing audiovisual services to be listed. The overall listing of FIG. 9 may provide a user with a single page snapshot of all the meetings for a given product. Each individual meeting code 904 showing FIG. 9 may represent a hyperlink to additional information for that meeting. For example, the hyperlink for meeting code GLX-F3F-3, 924 may bring the user to a display as shown in FIG. 10.

FIG. 10a is an embodiment showing details of the meeting designated by the meeting code of GLX-F3F-3. The meeting code is shown 1002 in FIG. 10a, as is the meeting status 1004 and the meeting type 1006. The meeting date is provided in a field 1008, and additional information indicating the format of the meeting 1010 is provided. In the example provided in FIG. 10a, the meeting topic is indicated as a meeting discussing type 2 diabetes in 1012, and the meeting time is indicated as 7:00 p.m. on 1014. The date the request for the meeting was received is also indicated in the display 1016, as is the host of the meeting 1018. Note that the host name is a hyperlink to a profile of that person. An organizer contact is provided in 1022, and additional point persons may be added, as well as a moderator 1026. Should a target list be included, its presence would be indicated by a flag in the field on the display 1028. The date that the seven day packet report was sent, as well as the date any invitations were mailed, are indicated in fields 1030, 1032 respectively. If the seven day package had a tracking number, it would be indicated on the display 1034. If edits to the attendant's roster were returned to the host, that would be indicated in field 1036, as well as any feed back report returned in field 1038. The host can also track the number of gift certificates requested in a field provided on the display 1040.

The present invention may display meeting notes to those hosting, organizing and attending the meeting 1042, thereby allowing meeting planners to exchange ideas and information so that the best ideas and resources of all of the meeting planners are utilized. A territory number 1044 and a contract location description 1046 may be available as drop down menus and may be pre-determined by a system administrator. Speaker information may be provided by utilizing the icon button for adding additional information 1048. A speaker's name may appear as a hyperlink 1050 if a speaker is listed. The hyperlink may provide a profile of the speaker so that additional information may be gained by those who have access to the system. The status of the speaker, such as confirmed or unconfirmed, may also be presented 1052, and the method of confirmation 1056 as well as the date of confirmation for the speaker 1058 may also be provided. To assure that the speaker has adequate transportation, speaker travel organizer 1054 may also provided so that speaker itinerary can be verified and included in the information offering to a host, organizer, speaker, or the like. FIG. 10b continues the display shown in FIG. 10a. The display shown on FIG. 10b may include speaker notes which can be used to record communication with, or to contact or communicate ideas to, the speaker, such as wherein the speaker may have access or to other members who are involved in meeting planning. Speaker notes 1060 may include contact or travel information, speaker topic information, financial information or qualifications relating to the speaker. The present invention may include browser-based review of notes, or attachments, in a meeting, or for a person related to a given meeting, such as attachments related to a speaker, such as a curriculum vitae, or to an audio visual supplier, such as a copy of the available equipment. Thereby, browser based attachments may be associated with any person, entity, or place within a database, and may be available to all users accessing a meeting involving that person, entity, or place, or to an authorized group of users accessing that meeting.

Figure 10C:
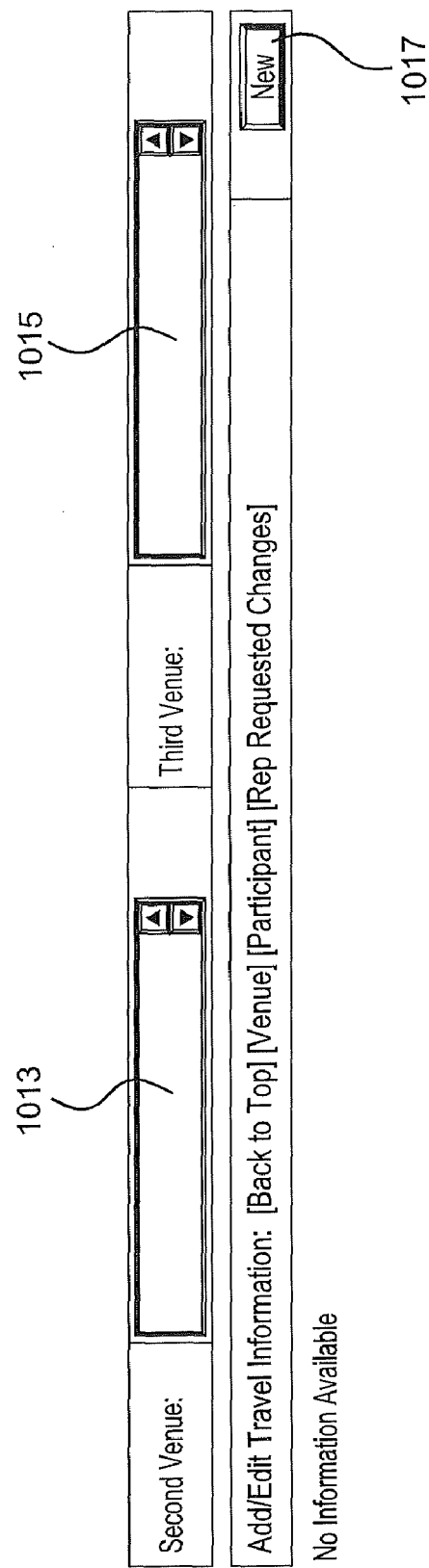
FIG. 10 is an embodiment of a display of the current invention.

In an embodiment shown in FIG. 10b, the business unit or geography, as well as budget categories may be displayed 1062, 1064. Details may be displayed on the same, or an associated, page by, for example, using a scroll down control bar. A toolbar 1066 may be used as a place to insert hyperlinks to jump back to the top of the page, to the travel portion, to the participant listing, to the financial summary or to request changes. The name of the venue 1068 may also be a hyperlink which provides a profile for a venue. The exemplary display of FIG. 10b provides a venue address 1070, phone number 1072, fax number 1074 and a contact at the venue 1076. The meeting room may be displayed 1078, as may be the contract status 1080, such as whether the contract has been signed for this specific date, and/or the time that the room at the venue is accessible 1081. The date that the reservation was made 1082 and the total capacity of the venue 1084 may also be displayed. The capacity of the venue may limit the total number of invitees to the meeting, and a venue may be recorded in a memory as being so limited. The date a venue has been supplied a credit card as a means of payment for the event may be provided as an in-date form in the display field 1086, for example. The cost per person 1088, the date of the contract for the venue 1090 and the venue cost 1092 may also be displayed. The date the contract was returned after being signed by the venue holder 1094, a method of payment 1096, may also be indicated. The audiovisual supplier for, for example, audiovisual aids, may be provided in 1098. The audiovisual supplier's name may be a hyperlink to a profile for that supplier, and may be displayed 1001. The audiovisual contact name 1003 and the supplier's city and state 1005 and phone number 1007 and fax 1009 may be displayed. Venue notes which indicate any information relevant to those who have access to the system may be placed in a text field provided in display 1011 of FIG. 10b. Until a venue is contracted, alternate venues also available may be displayed in FIG. 10c. If the meeting may occur in multiple locations, a second venue 1013 or a third venue 1015 may be provided in details with respect to those venues. Travel information may be added or edited, and entry of such may be accomplished via pushbutton 1017, for example.

Figure 11:
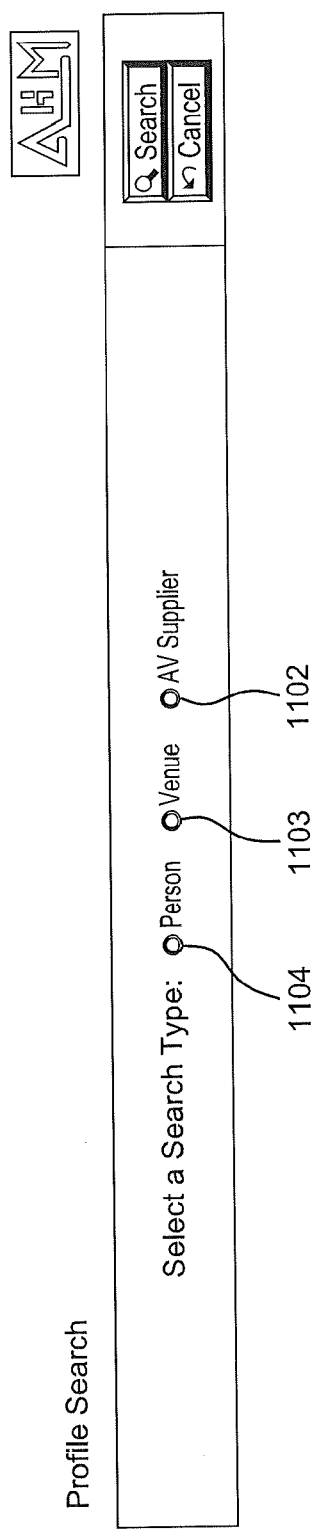
FIG. 11 is an embodiment of a display of the current invention.
Figure 12:
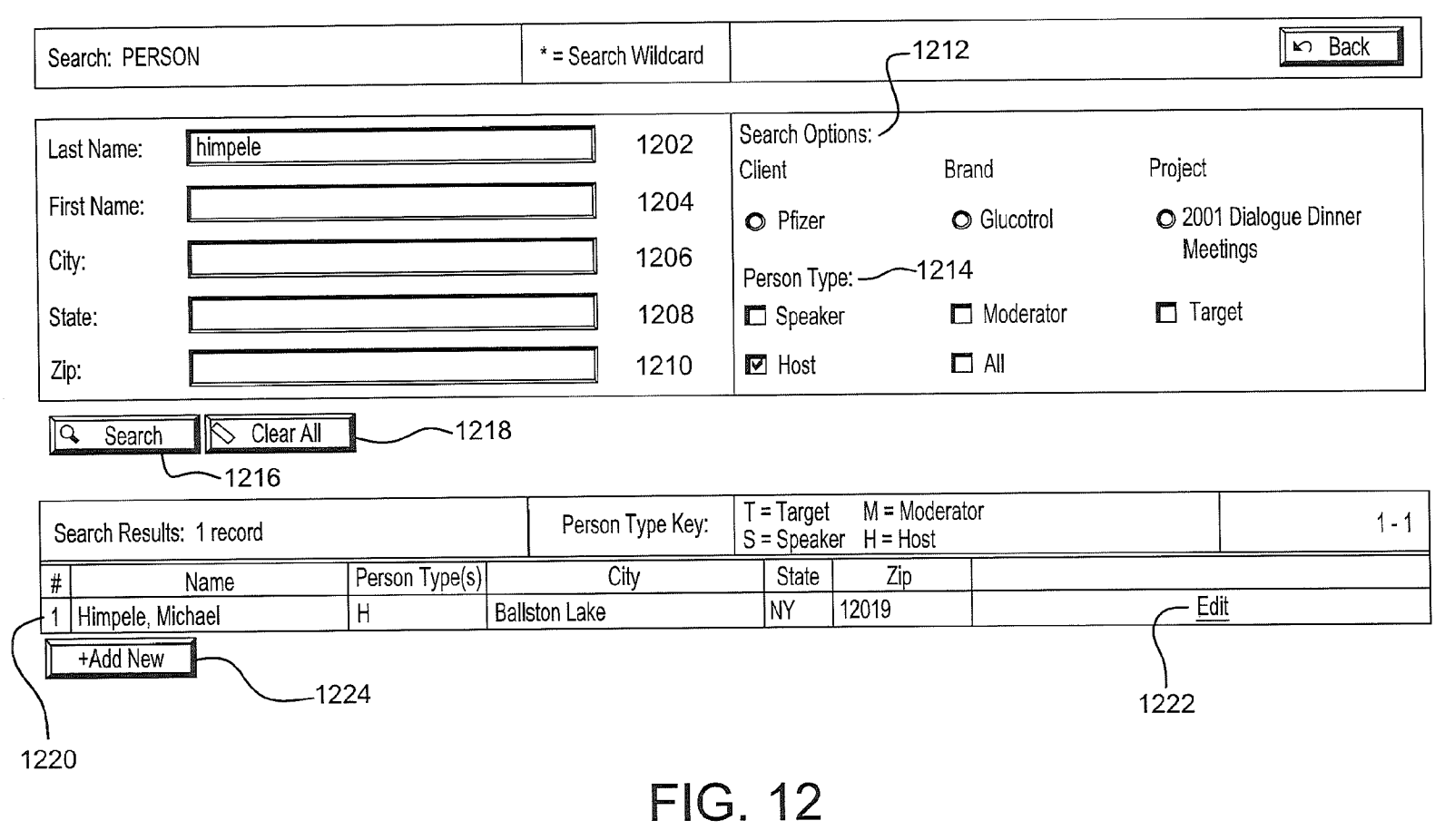

Returning to FIG. 9, if the profile edit button 924 is depressed, the display of FIG. 11 may be provided. FIG. 11 is an embodiment of a profile search that allows a profile edit after a search of a person 1104, venue 1103, or AV supplier 1102. A search may prioritize search results in accordance with an affiliation to people or entities. If the user selects radio button 1104 to search for a person, the display of FIG. 12 may be presented to the user. In the embodiment shown in FIG. 12, the search for a person may be completed by typing in the last name of the individual 1202. It is noted that different versions of the same person may exist with respect to different clients within the database. Additional information may include first name 1204, city 1206, state 1208 and zip code 1210. Additional search options for locating a person during a search may include client project 1212, a person type, either speaker, moderator, target, host, or any of the above 1214. The search may be initiated by depressing search button 1216, and a new search with clear fields may be acquired by depressing the clear all button 1218, for example. Also indicated in FIG. 12 are search results from a person search indicating name, the person-type, the city, state, and zip code, in a search results line 1220. Should any of the information be incorrect or subject to change or updating, the profile may be edited by depressing the hyperlink 1222, for example. If a new person record needs to be added to the database, the add new button 1224 may be used to add a new person to the profile database.

It is an aspect of the current invention that meeting data may be organized for effective use without viewing multiple screens. The structured reports provided by the current invention provide significant utility to the meeting planning process by informing meeting planners of various and multiple aspects of the current project. These combined aspects of the planning activity may be assembled into standardized reports.

Figure 13:
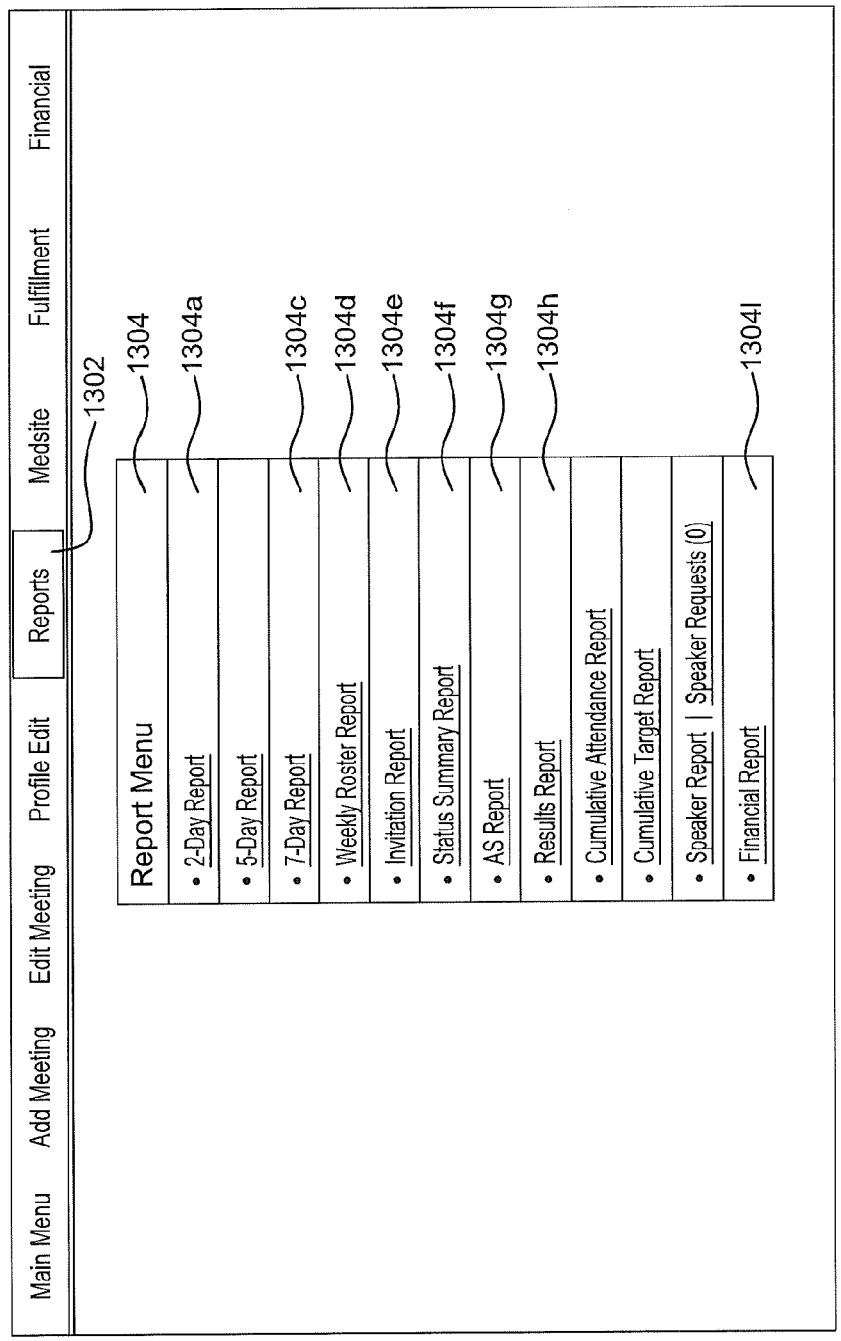
FIG. 13 is an embodiment of a display of the current invention.

Reports may be accessed using the toolbar shown in FIG. 13. The reports push button 1302 may display the report menu 1304 for the selected project. Selected reports may include multi-day reports, such as, for example, a two day report, five day report, seven day report, weekly roster report, invitation report, status summary report, AS report, result report, cumulative attendance report, cumulative target report, speaker report, speaker request and/or a financial report. The report types may be hyperlinks, and selecting any of the hyperlinks may bring up the report page. For example, selecting the two day report 1304a may bring up the page display in FIG. 14.

Figure 14:
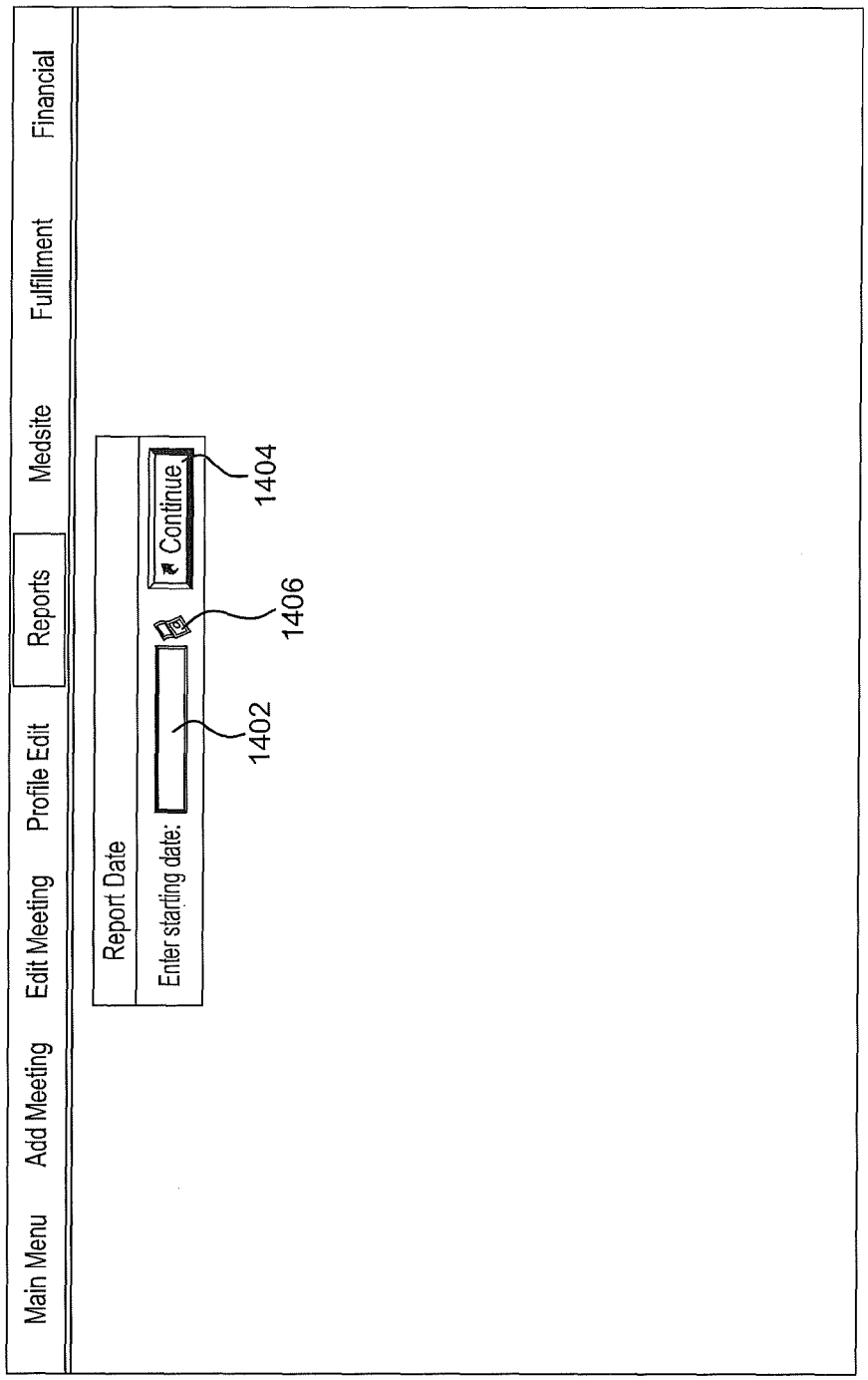
FIG. 14 is an embodiment of a display of the current invention.
Figure 15:
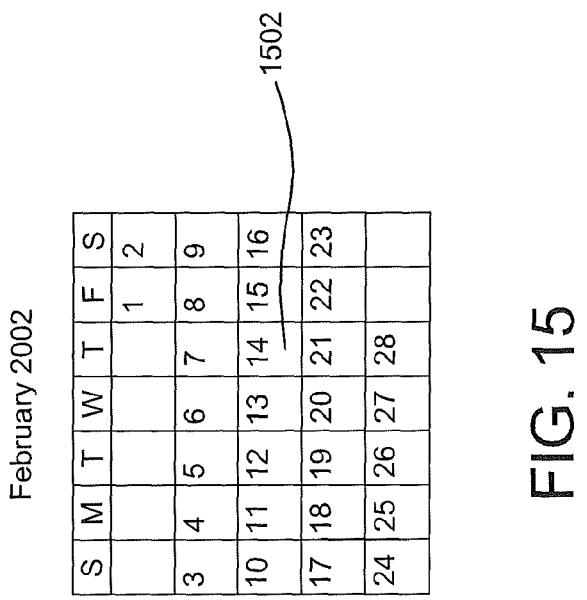
FIG. 15 is an embodiment of a display of the current invention.

FIG. 14 is an exemplary menu to access a two day report. The user may enter a report starting date 1402 and depress the continue button 1404. Alternately, the user may depress the calendar icon 1406 to bring up a calendar display, as shown in FIG. 15. The calendar display of FIG. 15 may allow the user to select a date to initiate a two day report. For example, if the user selects February 14 within the FIG. 15 calendar, the display of FIG. 16 may be provided.

FIG. 16 displays a screenshot of a dialog dinner meeting two day report for a reporting period ending Feb. 14, 2002, and displays the basic information concerning a project identified by a session code, date, time, location, and host, and displays the number of current and actual reservations and attendance 1604. FIG. 16 indicates the session code of the meeting, which may also be a hyperlink to allow a user to further investigate this particular meeting. The date and time 1604b, 1604c may be the date and time that the report for the indicated event was run.

Returning to FIG. 13, should the hyperlink for a seven day report 1304c be selected, the report shown in FIG. 17 may be displayed to the user. The report indicates that two session codes may have available seven day reports 1704, 1702. Also indicated are the date whereon the seven day packages were sent to those interested in receiving reports.

Should the summary status report 1304f be selected, the hyperlink may provide the page shown in FIG. 18 to the user. FIG. 18 displays an embodiment of the current invention that may be used to provide a summary status report for a user. The status report may indicate the general status 1802, as well as a count 1804 for all individual meetings under a certain product project. As shown in the example of FIG. 18, the list can be extensive, covering a total of 133 different meeting associated with business projects. The summary status report may indicate a session code 1806, date and time of the meeting 1808, the location of the project meeting 1810, the host and the host's extension 1812, 1814, as well as any additional host 1816. A moderator is shown in the table 1818, and a first, second and third speaker may be displayed 1820. The topic of the meeting may be shown in the field 1822, as well as the current reservation, total number of current reservation 1824, and the actual attendance of a completed meeting 1826. The overall status of the meeting may be provided in 1818.

Returning to FIG. 13, the hyperlink 1304d, weekly roster report, is selected. A display similar to that of FIG. 19 may be displayed. FIG. 19 displays a weekly roster report for all of the session code projects available under a particular product. A roster report may include the current reservations as well as the actual attendance at the various meetings associated with the project.

Returning to FIG. 13, the user may invoke an invitation report 1304e by selecting the associated hyperlink. As a result, a display as shown in FIG. 20 may be presented to the user. FIG. 20 represents an invitation report. The invitation report may include a project session code for each meeting 2002, the associated meeting time and date 2004, the location name of the meeting 2006, the host name 2008, the date the invitation was mailed 2010, the number of invitations actually mailed 2012, the number of acceptances from that invitation 2014, the actual attendance of the meeting 2016, if the meeting has already transpired, whether or not the roster has been returned and the date of return 2018, and the meeting status, such as either completed, set-up or canceled 2020. The invitation report of FIG. 20 allows a comprehensive single page view of all of the meetings scheduled within a business product line, and allows the user to inspect the number and status of all invitations.

Returning to FIG. 13, if the user selects a results report 1304h hyperlink, the display in FIG. 21 may be provided to the user. FIG. 21 is a results report that provides cumulative statistics on a particular program or series of meetings. The report is a results report 2102, and statistics for the multiple events or meetings are provided in the display in 2104. Provided in the body of the results report may be the individual projects session code 2106, the date of the meeting 2108, a host or additional point person 2110, the number of invitations mailed 2112, the number of RSVPs received 2114, and the actual attendance of the meeting 2116.

Returning to FIG. 13, if the user selects the Account Supervisor ("AS") report hyperlink, 1304g, a display as shown in FIG. 22 may be displayed to the user. FIG. 22 is an embodiment of an AS report. The AS report may include the meeting code 2202, the meeting time and date 2204, the meeting status 2206, speaker status 2208, the date the request was received 2210, the date the speaker was confirmed 2212, the date the contract for the speaker was returned 2214, the date the invitations for the meeting were mailed 2216, the date a seven day report was sent 2218, and the date that the roster was retained 2220.

It is an aspect of the present invention that a financial report concerning a particular program or series of meetings may be generated for a user. An embodiment of a financial report is provided in FIG. 23. FIG. 23 illustrates a screen shot of a financial report wherein only a portion of all the financial topics is visible 2302. Table 1 lists exemplary titles for financial perimeters associated with the meeting that may be detected in FIG. 23. The financial report may display the Table 1 parameters for each individual meeting project, for example, and may total the amount to provide the user an estimate of meeting costs and expenses.

TABLE 1

Financial Report Headings

| | |
|---|---|
| meeting code | speaker airfare |
| meeting date | speaker car |
| business unit | venue deposit |
| geography | District business manager expense |
| meeting type | freelancer fees |

TABLE 1-continued

Financial Report Headings

| | |
|---|---|
| meeting format | grant request |
| host | management fee |
| miscellaneous | hotel |
| attendee honorarium | car |
| speaker air fare | on-site staff fees |
| speaker expenses | on-site staff expenses |
| speaker honorarium | supplies |
| entertainment | postage and attendee expenses |
| venue room fees | |
| outside audiovisual fees | |
| F & B fees | |
| venue deposit | |
| speaker honorarium | |

Figure 24:
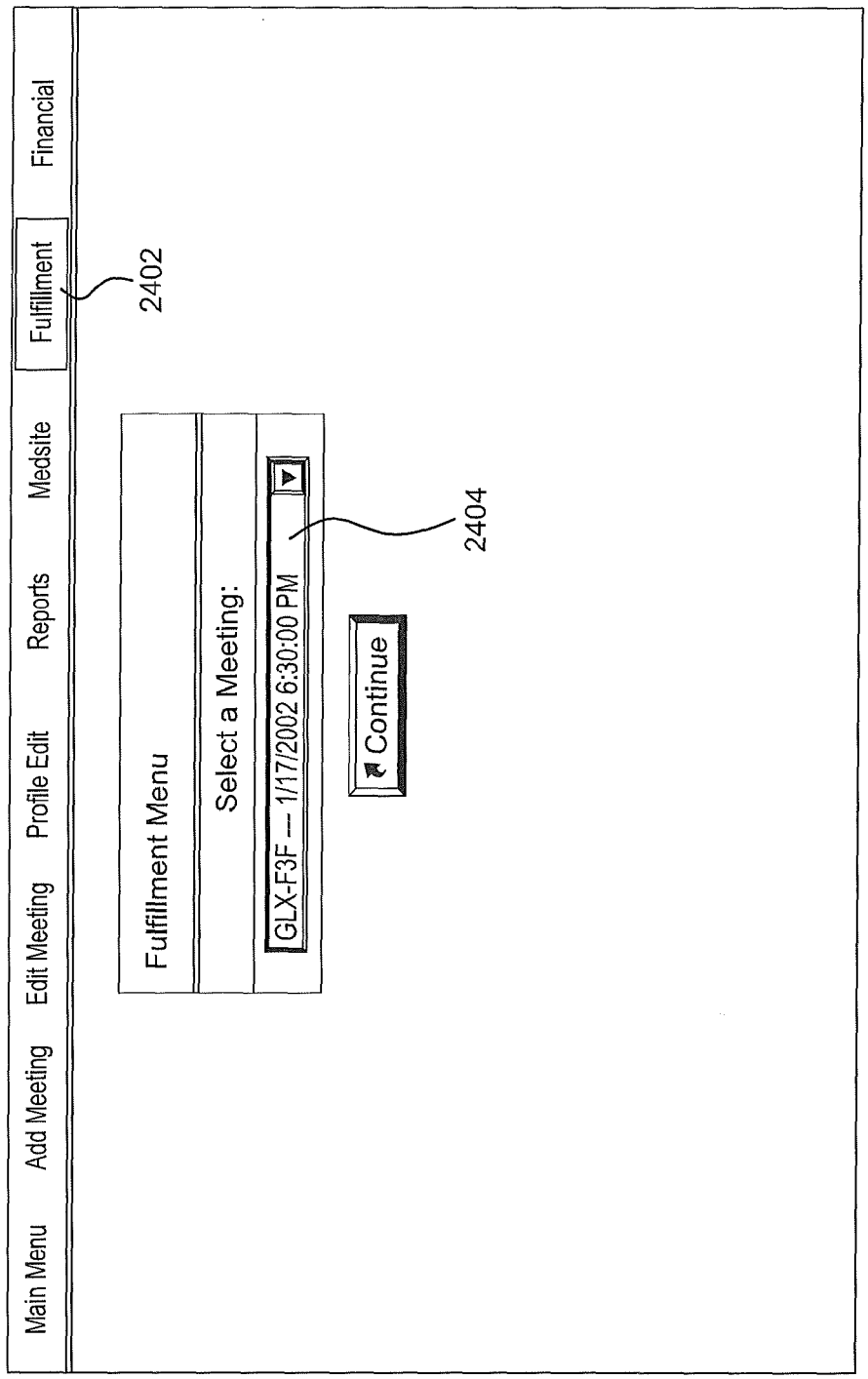
FIG. 24 is an embodiment of a display of the current invention.

FIG. 24 illustrates an embodiment of the present invention in which the user selects the fulfillment menu button 2042 and selects from the drop down menu 2404 a meeting in which letter or e-mail correspondence needs to be generated. FIG. 25 illustrates fulfillment items for a particular project. These fulfillment items may include such meeting-specific items, for example, as a comma separated value file 2502, an attendee separated value file 2504, a venue confirmation 2506, a cover memo 2508, a cancellation fax 2510, a cancellation notice 2512, an invitation 2514, a speaker confirmation 2516 and 2518, an invitation 2520, a thank you letter for a local speaker 2522, a national single speaker thank you letter 2524, a reminder fax 2526, and/or an request for receipt 2528. The user may use fulfillment items to simplify and efficiently develop correspondence necessary to execute plans for the meeting or project, or to communicate with persons affiliated with an event or series of events, such as speakers, attendees, venues, A/V suppliers, and/or hosts.

Figure 26:
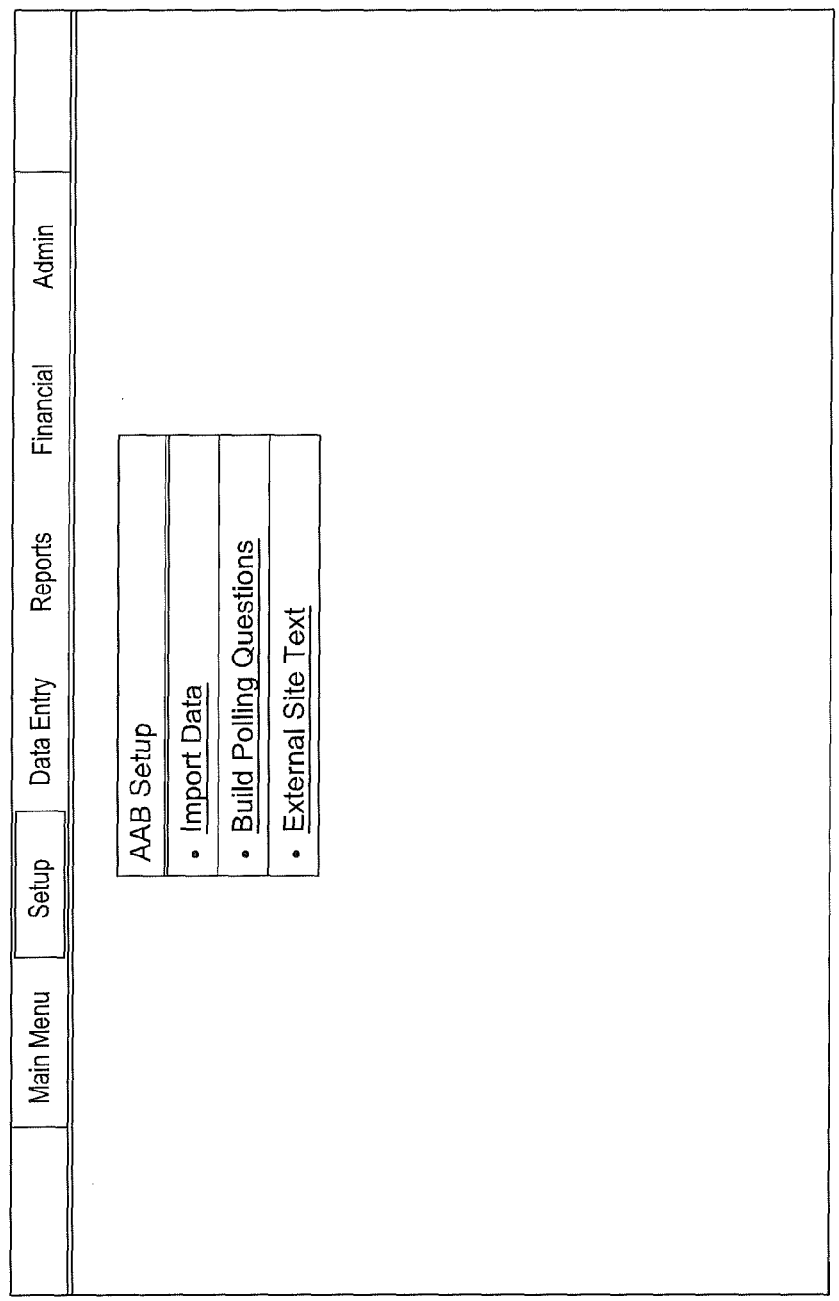
FIG. 26 is an embodiment of a display of the current invention.
Figure 27:
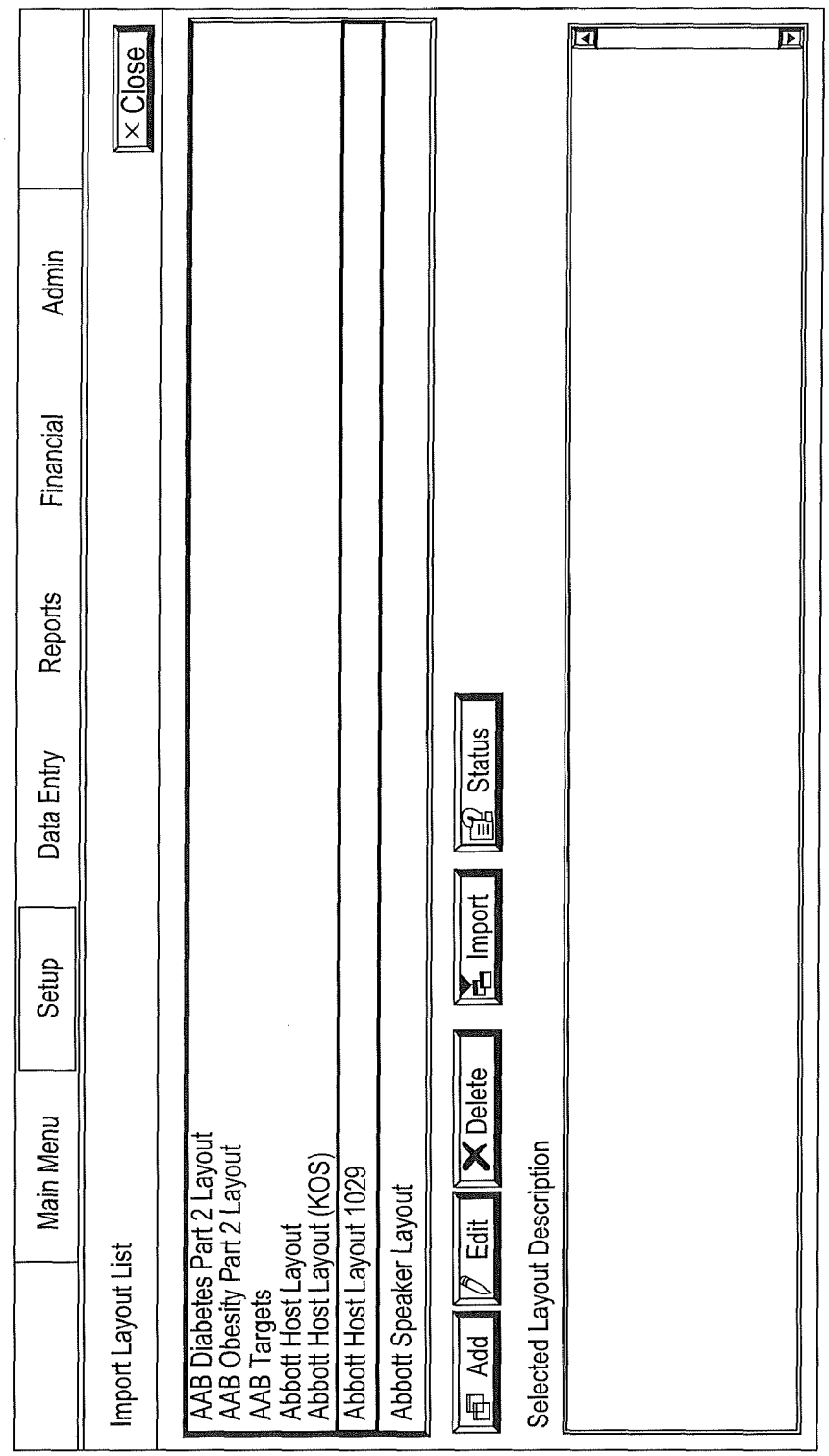
FIG. 27 is an embodiment of a display of the current invention.

As set forth hereinabove, the present invention may include within, or in conjunction with, a planning system, an advocate builder. An advocate builder may, for example, allow for data collection and/or entry by an authorized client. The advocate builder may be accessed, for example, similarly to the planner as set forth hereinabove, such as by login as a client, for a particular selected project. Upon access to the advocate builder, a user may access a set-up menu, to allow for the advocate builder to be set-up. An exemplary set-up menu of the advocate builder is illustrated in FIG. 26, and may include, for example, the importation of data, the building of polling questions, or text from, or related to, or for forwarding to, an external site. The layout of particular data may vary, and the layout may be entered to the advocate builder for importation of the particular data, as shown in FIG. 27. Layouts to be imported may be added, edited, deleted, or accessed, for import or status check, as illustrated in FIG. 27.

Figure 29:
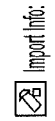
FIG. 29 is an embodiment of a display of the current invention.

FIG. 28 illustrates an exemplary embodiment of the present invention in which the user accesses the edit selector in the set-up menu of the advocate builder. FIG. 28 illustrates the editing of data importation layout, such as the editing of when data importation occurs, the status of the occurrence, and the progress of the importation. A user may receive an alert on various factors in the importation process, such as preparing, failure, stalling, stopping, running, or completing of the importation, as illustrated. Additional information may be provided in the edit screen, as illustrated in FIG. 29.

FIG. 30 illustrates the selection of a particular importation layout. The description for the layout is illustrated in FIG. 30, as is the template for the layout. This layout may be changed, saved, previewed, or viewed, as raw columns, for example, as illustrated in FIG. 30.

FIG. 31 illustrates an exemplary selection of the raw columns of data for the importation layout. Additionally, FIG. 31 illustrates that the layout may be mapped to a user defined template, for example.

FIG. 32 illustrates the selection to build polling questions, such as from within the advocate builder set-up. A polling question may be entered by a text entry, as illustrated, and selectable answers, such as multiple choice answers, may be entered. Further, multiple additional questions and/or answers may be entered, for example. The question entered may be saved and/or added, such as to a list of questions, saved and/or exited from, or not saved, as selectable by the user. Alternatively, polling questions may be imported from other applications, or viewed from within other applications within the polling question generation window, or copied and pasted from other applications, for example.

FIG. 33 illustrates an exemplary embodiment of an external site set-up as selected from the set-up menu. For example, the external site caption may be entered, as may be text for pages of the external site, such as the opening or closing page of the external site. Portions of a data entry page may additionally be entered, such as for combination with, and/or display of, polling questions discussed hereinabove. Further, the external site set-up may be programmed to include a thank you for display on the external site, such as to thank a party for answering polling questions. Additionally, email addresses, fax numbers, or other information may be entered as a list to which the polling questions are to be sent, for example.

FIG. 34 illustrates an exemplary selection of a data entry menu from within the advocate builder. As illustrated, data may be selectable, such as alphabetically and by different categories.

FIG. 35 illustrates a market report in accordance with the advocate builder. The market report may, for example, be broken down by market, and may include information regarding nominees, friends, influencers, or referrers. A party nominated to answer polling questions may be, for example, a party initially selected to respond to the polling questions, and that nominee may name, nominate, or have assessed, friends or influencers, and may become a referrer by naming a friend or influencer, for example. A nominee report may appear, for example, in the format of FIG. 36. A friend report may appear, for example, in the format of FIG. 37.

FIG. 38 illustrates a report showing polling question results. The polling question results report may include individualized, or cumulative, responses to questions in the polling. Such responses may be broken down by particular categories, such as by particular medical fields of the respondents, for example. Full text responses may, for example, be searched for key elements, and may be reported in accordance with those key elements, for example.

Figure 39:
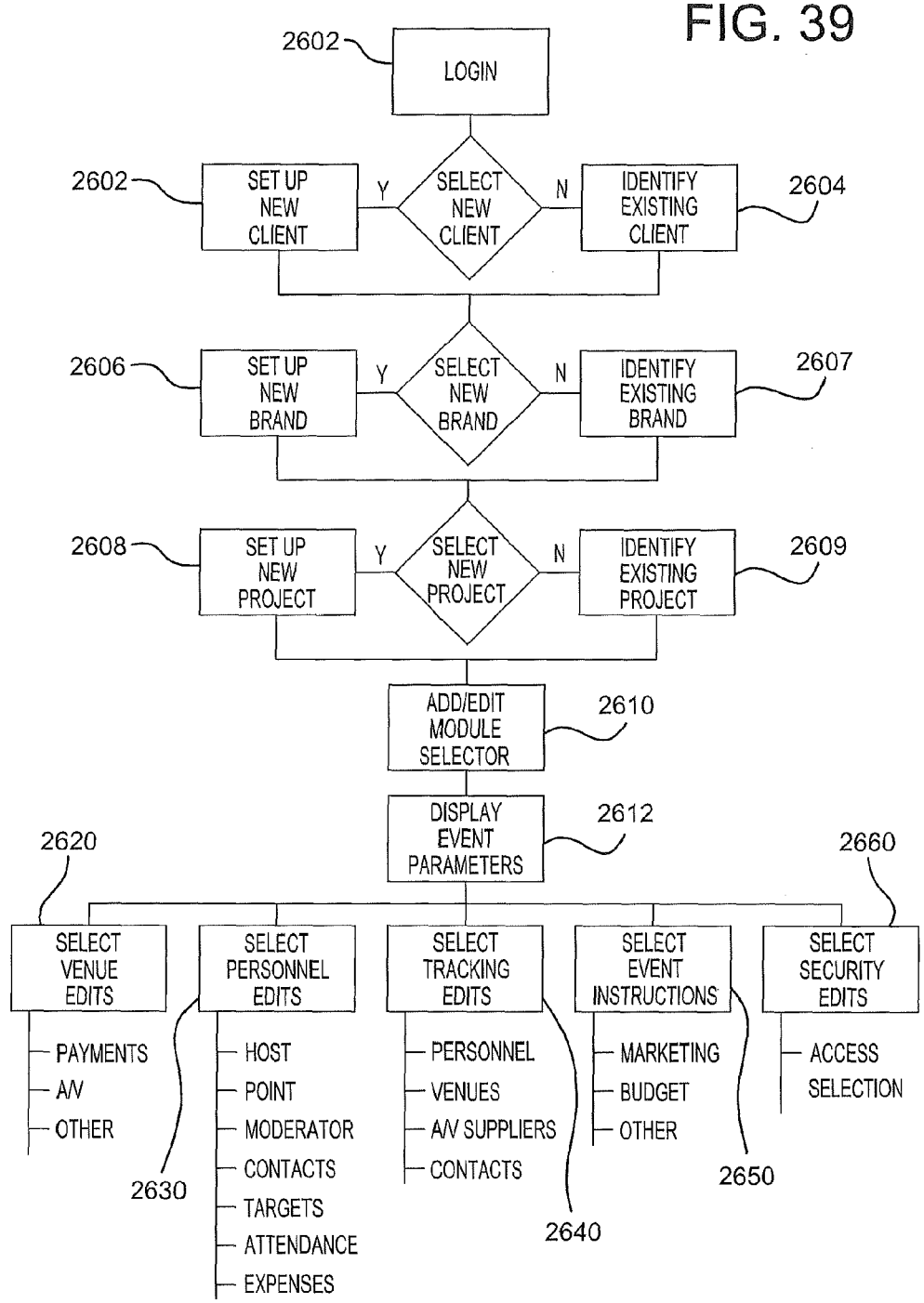
FIG. 39 is a block diagram of a portion of the current invention.

In an exemplary operational embodiment, the planning system may be divided into clients, wherein each client may log in individually, and within each client may be present, for example, one or more brands related to that client, or one or more projects related to that client, or related to a particular brand of that client, for example, as discussed hereinabove, and as illustrated in the flow diagram of FIG. 39. Thus, upon logging in 2602, a user may be able to, for example, set up a new client or subclient, or select an existing client 2604, wherein a particular user may log into multiple clients within the planning system. Following selection of a client 2604, a user of the planning system may be able to, for example, set up a new brand 2606, or select an existing brand 2607, or set up a new project 2608, or select an existing project 2609.

A project may include, for example, at least one meeting which may be selected as all, or a portion, of that particular project. Upon selection of a project 2608, or a meeting, or upon selection to set up a new project or meeting, the user may be presented with an add/edit meeting selector. The user may add or edit a meeting through this selector 2610, or, in an alternative embodiment, a meeting may be automatically added or selected in accordance with, for example, a received e-mail, a received telephone call, or a received fax. The add/edit meeting module may allow a user to track and/or modify a meeting in accordance with a meeting status, for example. The add/edit meeting module may allow, for example, a comprehensive review of the meeting, a review of meeting status, a comprehensive venue status, a comprehensive audio visual status and/or a target attendee status review, as discussed hereinabove. Each of these portions of the module may be selectable, such as using a hyperlink, and, upon selection, may evidence varying levels of detail within that portion of the module.

For example, each meeting may be keyed by a meeting code, and each meeting may have a meeting status. The meeting status may be, for example, in progress, set up complete, completed, postponed, not requested, cancelled, or planned but no date supplied, for example. The add/edit meeting selection 2610 may additionally evidence the meeting date, the meeting time, the meeting business unit such as business units within the client, the geographic location of the meeting, and additional information directed to the desirable attendees for that meeting 2612. Selection of the add/edit meeting module may additionally allow for selection of the host, a point person, a moderator, a contact name or listing, target listings, moderators, speakers, or attendance rosters 2630.

In this exemplary embodiment, upon selection of, for example, the venue, the venue name, address, telephone and/or fax number, contact name, and/or venue notes, may be displayed or may be edited. Additional information related to the venue may be viewed, such as the contract status with the venue, which may be, for example, unavailable, reserved, contract sent, contracted, or initial request made, for example. Additionally, the meeting room or area of the venue may be selected, as may be the capacity or cost, such as per person, of the venue. Thereby, aspects of the venue may be reviewed and/or edited by authorized users 2620 of the planning system. Additionally, authorized users may, for example, record payment to the venue, or other owed expenses, such as by credit card, or printing of a business check. A user may additionally make venue arrangements for audio visual equipment to be supplied to the venue, such as the audio visual supplier, an audio visual contact name, supplier name, supplier location, or supplier contact information. Additionally, alternative audio visual suppliers may be entered.

Selection 2610 of the add/edit meeting module may additionally allow for the selection of particular functions for the speaker and/or moderator. For example, information may be tracked for the speaker and/or moderator, such as a record of whether a speaker has provided personal information, such as a personal biography, curriculum vitae, speaker honoraria amount, speaker airline preferences or expenses, car, hotel, food, or other travel preferences or expenses. Other expenses related to the meeting and/or the speaker may be tracked, such as room fees, restaurant charges, audio visual charges, entertainment charges, other miscellaneous expenses, and each expense tracked by the add/edit meeting module may be interoperable with the accounting systems apparent to those skilled in the art, such as Microsoft Quicken or Microsoft Great Plains, for example.

Further, the add/edit meeting selection 2610, as set forth hereinabove, may allow for the tracking for particular attendee functions, such as invited participants, acknowledged participants, payment of acknowledged participants, tracking of accounts receivable, and tracking of accounts paid. Overall, a total attendee or guest count may be provided, such as in order to select numbers of handouts necessary for availability during a meeting. Particular attendees may be tracked using the add/edit meeting module, such as overall attendance or attendee status, which may include yes, no, wait listed, cancel, or invited, whether or not an attendee actually attended, whether an attendee is, or is to be, removed, and whether particular attendee confirmations are to be made available or have been provided by a confirmation fax, mail, e-mail, invitation, telephone call, or other methodology. All attendance information may be conveniently provided in, for example, a summary table.

In this exemplary operational embodiment, the planning system may additionally include tracking for all persons and places involved with a particular project, brand, client, or multiple clients, within the planning system. For example, an add/edit person or place module may be included within the system, that may allow the system to overall track 2640 particular persons, venues, audio visual suppliers, hosts, speakers, moderators, users, and/or attendees. For example, for each person or venue, or vendor entered into the system, contact information may be available. This contact information may include, for example, names, addresses, multiple telephone numbers, mobile telephone numbers, fax numbers, emergency contact information, or additional information, such as comments, that will allow for contacting of particular contacts within the person, company, or venue or vendor data base. It will be apparent to those skilled in the art that multiple fields may be available for entry of particular information, such as fax numbers for home, business, or other, or multiple name fields, which may allow, for example, the selection of first, last and middle names, or the selection of company names. Additionally, drop-down menus may be provided for selection of particular information within the contacts listing, such as suffixes to follow particular names, such as MD, Sr., Ph.D., Pharm D., RN, APRN, PA, DO, or Esq., for example. Further, additional fields may be added, or may be available, for entry of information specific to particular projects, meetings, brands, or clients. For example, target profiles for particular meetings may include, for example, education level information, ME numbers, DEA numbers, AOA numbers, district numbers, social security numbers, or other necessary or desired information. Further, where available, electronically available information may additionally be provided in the contacts listing such as electronic, or scanned, business cards or other specialized or specialty information, such as a speaker curriculum vitae or biography.

Variations of the fields set forth hereinabove, or additions made thereto, may be monitored 2660 by a permission level security interface. For example, a field sales representative may be entitled to access, or be allowed to modify, only particular information related to a particular meeting. Other information may not be added or edited by that field representative, and this accessibility may be controlled by a security interface, as will be apparent to those skilled in the art. Further, all or a portion of the information passed from a remote planning system to a local interface may be secure information, such as by data encryption apparent to those skilled in the art.

In this exemplary operational embodiment, a user entering information may be allowed to enter information, or may be prompted to enter particular information, such as wherein a meeting profile, person profile, or place profile, has been created, and particular information has not been entered. For example, upon completion of a meeting request, the planning system may prompt a field sales representative to create a target list for that meeting, wherein a target list has not yet been created. The field representative may then either enter a target list as part of selection 2630, or select that a target list will be entered at a later date. This target list may then be entered, such as, for example, by a download in the entirety from, for example, a Microsoft Excel spreadsheet, or the information may be, at that date or a later date, hard coded manually into the system.

Further, particular information items may be provided to the user filling out a given request, as the request is being filled out. For example, the system may provide 2650 specific instructions that are applicable to particular events or event types. For example, the marketing department within a particular client may limit attendance to 15 attendees per meeting, such as due to marketing budgetary constraints. In such an instance, wherein a meeting has been set up using the add/edit meeting module, and it is entered that the marketing department is to fund the meeting, a message box may appear for the user that instructs "at marketing funded events, attendance is limited to 15 per meeting, and attendees must have signed consulting agreements, may not bring spouses, and will not be paid honorarium. Further, the venue budget is limited to $2000 per meeting, and any excess must be entered into the 'additional expense field.'". The user may be given the option to accept or reject these instructions. Thus, the planning system may include a plurality of business rules, that may be applied to particular meeting, projects, brands, or clients. These business rules may be entered by clients, field representatives, planning system administrators, or any authorized user.

Figure 40:
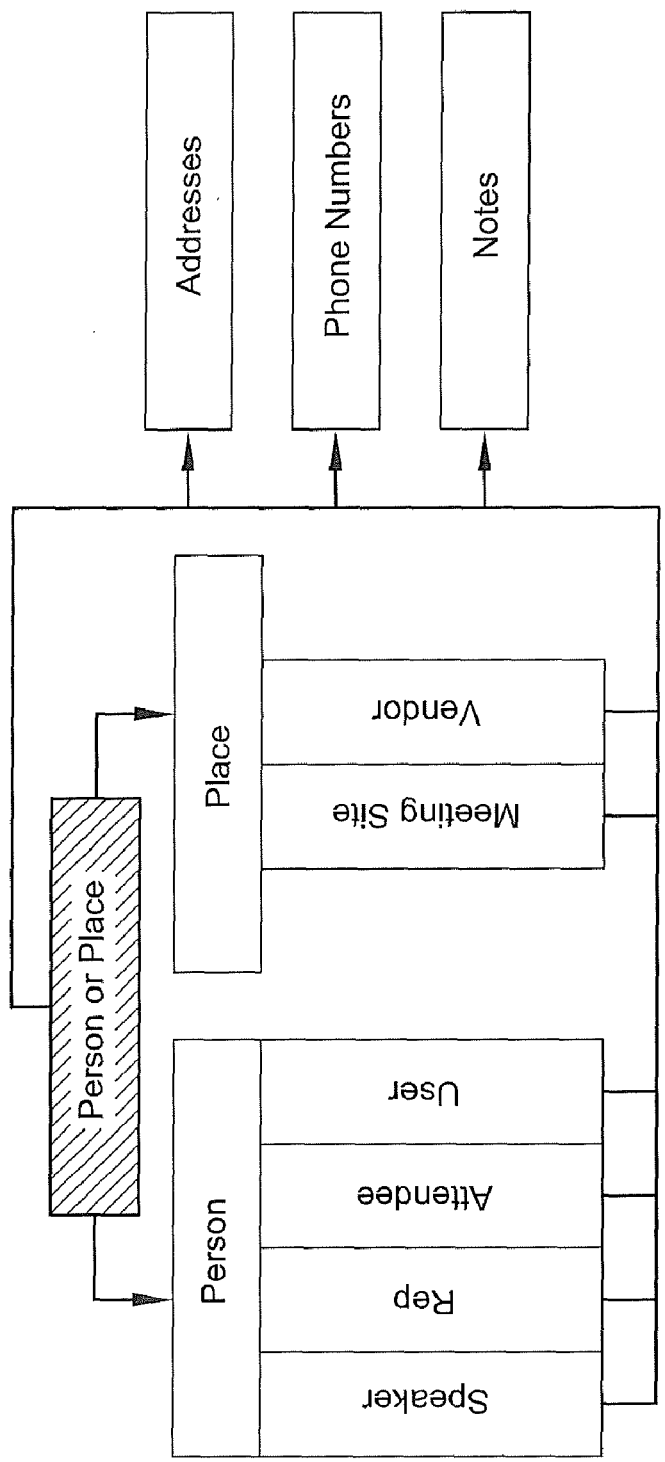
FIG. 40 is a block diagram of the present invention.

Further, such as within the business rules, the planning system may include a hierarchy, such as a hierarchy through which meeting requests, or expense requests must pass, as illustrated in the block diagram of FIG. 40. In such an embodiment, a meeting request may be generated, and may be passed for approval, such as automatically by e-mail, to a client administrator. Alternatively, expenses within the meeting request may be passed to an accounting department within the client for approval. In such an exemplary embodiment, upon approval by the accounting department, check requests may be automatically generated, such as by interface of a check generation software to the planning system approval methodology, thereby generating checks without any human interaction other than approval of the expense. Alternatively, as will be apparent to those skilled in the art, a check request may be manually approved, and a check may be manually generated.

Figure 41:
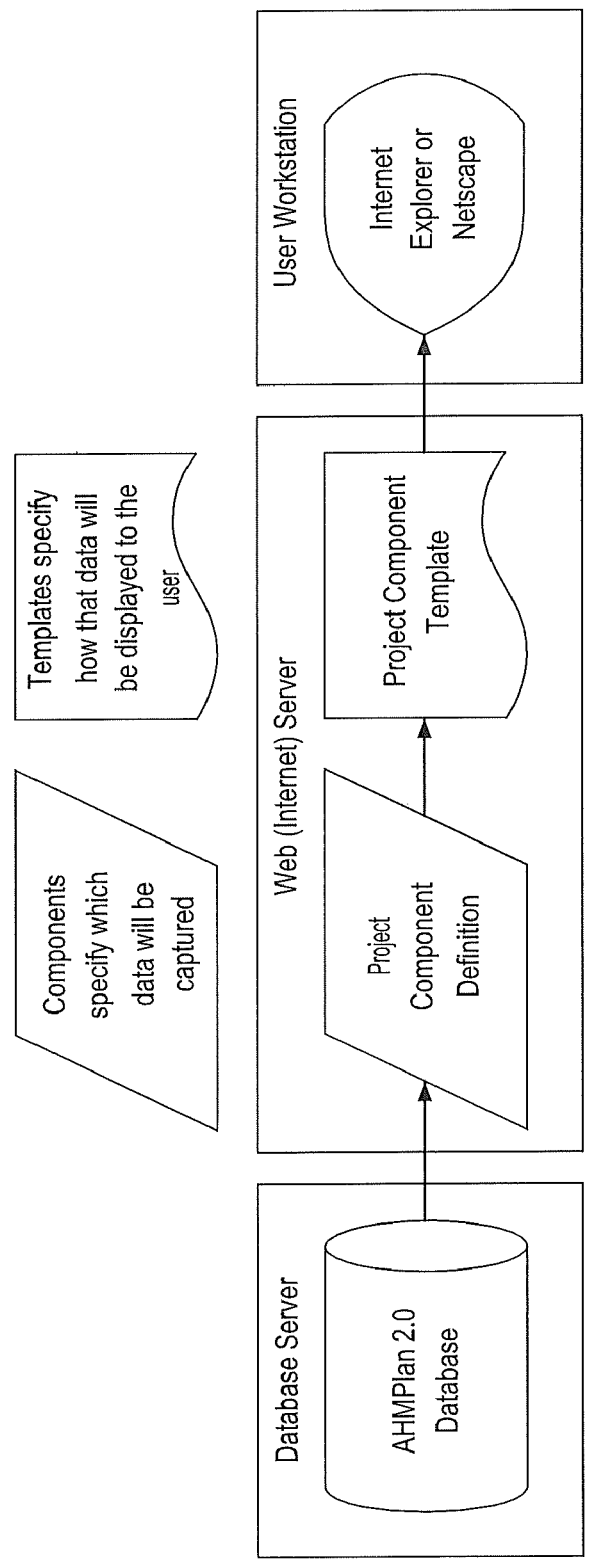
FIG. 41 is a block diagram of the present invention.

In an exemplary embodiment, business rules may be applied using components and templates, wherein components are the data that has been, or may be captured, and wherein the templates select the manner in which the components will be stored and/or displayed. FIG. 41 is a block diagram illustrating the accessing, from a user work station, via the internet, such as Internet Explorer or Netscape, of the planning system databases. The web server that receives the user request, may break the request down into component definitions, and may select a template in accordance with the desired or received component, as illustrated.

FIG. 42 is a schematic illustration of an architecture 2902 to employ the planning system discussed hereinabove. The architecture 2902 may include, for example, a rich client 2904, a thin client 2906, a presentation level 2908, a business logic level 2910, and a data level 2912. The data level may include, for example, data bases, legacy systems, and external applications. The architecture may further employ, for example, a firewall.

This multitier architecture may be developed using, for example, a Microsoft Windows DNA model. The presentation tier may include, for example, user interfaces. The business logic level may include, for example, the business rules discussed hereinabove. The presentation level of the architecture may use, for example, HTML programming for presentation to the user. Further, tools and applications available on the presentation level may use, for example, standard HTML or XML. In the data level, data may be resident, in part, in a database on, for example, a Microsoft SQL server. Universal data access from, for example, the business logic, may be granted through, for example, an ADO. Using a distributed server environment, the planning system may include a plurality of distributed servers. For example, a data architecture, such as a database, may reside on one server, and middle tier components, such as business logic, may reside on a second server. HTML pages, or other user interfaces, may reside on the second server or may reside on a third server. Thereby, no single server experiences overload.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and the equivalents thereof.

What is claimed is:

1. A planner apparatus for building at least one assigned-time event plan correspondent to a request of a non-attendee meeting requester, comprising:

a project management module, wherein at least one information item pertaining to one of a plurality of event parameter sets, including an assigned time associated with the at least one assigned-time event plan, is received from the non-attendee meeting requester, wherein at least some event parameters of the event parameter sets have associated business rules restricting planner selection of others of the event parameters of the event parameter sets in combination with the business rule associated event parameters;

an event logistics module, wherein ones of event parameters from the plurality of event parameter sets for at least recruiting of individuals for attendance at said event, selection of venue and speakers for said event, and travel logistics for said event, in accordance with said at least one information item, are presented for selection by a meeting planner based on the assigned time event request from the non-attendee meeting requestor outside of control of the non-attendee meeting requestor and event planner selection of at least one of the presented events parameters is restricted by at least one of the business rules;

at least one database, wherein the at least one information item, and wherein the event parameters of the plurality of event parameter sets for said recruiting, venue, speakers, and travel logistics are stored;

a fulfillment request module, wherein fulfillment of the assigned-time event plan of a meeting is performed based on selections of the event parameters from each of the ones of the plurality of event parameter sets, wherein said at least one database limits eligible ones of the event parameters of each of the plurality of event parameter sets for the at least one information item, and subsequently selectable ones of the event parameters, based on a hierarchical rule set unique to the interdependencies between the at least one information item, each of the event parameters, and each of the plurality of event parameter sets for selection, and wherein each selection of one of the eligible event parameters effectuates a variation in the presentation at the event logistics module to the meeting planner of others of the event parameters;

a reporting module, wherein data associated with said assigned-time event plan, in accordance with said at least one information item and at least one event parameter, is provided to the meeting requestor.

2. The planner apparatus of claim 1, wherein said project management module comprises a representative list management, a speaker list management, a task list management, and a security access control.

3. The planner apparatus of claim 1, wherein said fulfillment module comprises one or more of the group consisting of a venue confirmation letter generator, a cover memo generator, a cancellation fax and notice form generator, a custom invitation generator, a speaker confirmation letter generator, a generic invitation letter generator, a speaker thank you letter generator, a reminder fax generator, and a request for receipt generator.

4. The planner apparatus of claim 1, wherein said reporting module generates one or more of the group consisting of multiple day reports, invitation reports, status summary report, results report, hyperlink report, cumulative attendance report, and financial reports.

5. The planner apparatus of claim 1, further comprising a financial module, wherein estimates of cost are generated.

6. The planner apparatus of claim 1, further comprising a security access control module.

7. A method for planning by a planner of an assigned-time meeting utilizing an application remote from a non-attendee requester of the meeting, said method comprising:

receiving a logging onto the application by the planner;

receiving a meeting identifier correspondent to the assigned-time meeting;

receiving from the planner of a selection of at least one event parameter, from a plurality of event parameter sets stored in at least one database, for said meeting, outside of control of the non-attendee requester;

receiving from the planner an identification of participants for said meeting, outside of control of the non-attendee requester, wherein the identification of participants comprises one of the plurality of event parameter sets, and wherein others of the plurality of event parameter sets are selectably presented to the planner as a varied selection of remaining selectable ones of said plurality of event parameter sets that is effectuated by a hierarchical rule set of interdependencies between ones of the plurality of event parameter sets and the selected at least one event parameter and at least one business rule that restricts planner selection of select combinations of parameters of the event parameter sets;

sending said participants invitations to said meeting outside of control of the non-attendee requester;

assembling statistics on replies to said invitations outside of control of the non-attendee requester;

sending reminder notices to said participants upon said assembling of statistics outside of control of the non-attendee requester;

tracking expenses for said meeting outside of control of the non-attendee requester; and generating reports concerning said meeting.

8. The method according to claim 7, wherein said participants include one or more selected from the group consisting of speakers, moderators, and guests.

9. The method according to claim 7, wherein said invitations include one or more selected from the group consisting of correspondence letters, e-mail and faxes.

10. The method according to claim 7, wherein said statistics include one or more selected from the group consisting of number of invitations mailed, total invitations accepted, average invitations accepted, total attendance, and average attendance.

11. An apparatus for planning at least one assigned-time event correspondent to a request of a non-attendee meeting requester, comprising:
   a database storing a plurality of event parameter sets including at least recruiting, venue and speaker meeting parameters and an assigned time associated with the at least one assigned-time event plan, wherein at least some event parameters of the event parameter sets have associated business rules restricting planner selection of others of the event parameters of the event parameter sets in combination with the business rule associated event parameters;
   an event logistics module presenting ones of the event parameters for selection by a planner distinct from the non-attendee meeting requestor based on a request from the non-attendee meeting requestor, wherein the presentation of the event parameters from each of the plurality of event parameter sets in the database by the logistics module to the planner is restricted by:
      planner selection of at least one other presented event parameter from the plurality of event parameter sets in the database; and
      at least one of the business rules responsively to planner selection of a business rule associated event parameter from the plurality of event parameter sets in the database; and
   a reporting module, wherein information associated with the assigned-time event plan, in accordance with said assigned time and at least one selected event parameter, is provided to the non-attendee meeting requestor.

* * * * *